(12) United States Patent
Craig et al.

(10) Patent No.: US 8,780,232 B2
(45) Date of Patent: Jul. 15, 2014

(54) SYSTEM AND METHOD FOR ANALYZING A DIGITAL IMAGE

(75) Inventors: Murray D. Craig, Johnstown, CO (US); Gregory Hofer, Loveland, CO (US); Susan E. Manson, Berthoud, CO (US); Amy E. Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 12/684,505

(22) Filed: Jan. 8, 2010

(65) Prior Publication Data
US 2010/0123805 A1 May 20, 2010

Related U.S. Application Data

(62) Division of application No. 11/054,291, filed on Feb. 8, 2005, now abandoned.

(51) Int. Cl.
 H04N 5/262 (2006.01)
 H04N 5/225 (2006.01)
 H04N 5/235 (2006.01)
 G03B 15/03 (2006.01)

(52) U.S. Cl.
 USPC .......... 348/240.99; 348/240.3; 348/373; 348/362; 396/155

(58) Field of Classification Search
 CPC ....... H04N 5/222; H04N 5/262; H04N 5/228; H04N 7/18; H04N 9/74; G03B 13/10; G03B 15/03; G03B 17/00
 USPC .............. 348/362–371, 155–206, 333.02, 348/333.04, 208.99, 208.1–208.6, 348/240.99–240.3, 373, 333.13, 132, 579; 396/155–206, 379
 See application file for complete search history.

(56) References Cited

U.S. PATENT DOCUMENTS

| 6,246,837 | B1 * | 6/2001 | Kageyama et al. ........... 396/287 |
| 6,608,650 | B1 | 8/2003 | Torres et al. |
| 6,714,249 | B2 | 3/2004 | May et al. |
| 6,754,445 | B2 * | 6/2004 | Nakata ........................... 396/54 |
| 6,930,718 | B2 * | 8/2005 | Parulski et al. ........ 348/333.11 |
| 6,970,199 | B2 | 11/2005 | Venturino et al. |
| 2003/0026609 | A1 * | 2/2003 | Parulski ..................... 396/281 |
| 2003/0076420 | A1 | 4/2003 | Akiyama et al. |
| 2006/0170793 | A1 * | 8/2006 | Pasquarette et al. ..... 348/240.99 |

* cited by examiner

Primary Examiner — Lin Ye
Assistant Examiner — Marly Camargo

(57) ABSTRACT

A method of analyzing images captured using an imaging device is provided herein. The analysis provides suggestions for changing a parameter of the imaging device during subsequent image capture.

9 Claims, 10 Drawing Sheets

SYSTEM AND METHOD FOR ANALYZING A DIGITAL IMAGE

CROSS-REFERENCE TO RELATED APPLICATIONS

This application claims priority as a divisional of U.S. application Ser. No. 11/054,291, filed Feb. 8, 2005 now abandoned, which is hereby incorporated by reference as though fully set forth herein.

BACKGROUND

With the proliferation of low cost microprocessors, memory and image capture electronics, digital cameras are gaining popularity and are becoming more and more widely available to a larger number of consumers. One of the advantages of a digital camera over a conventional film camera is that when a digital camera captures an image, the image is stored electronically in a memory element associated with the camera and is available for immediate viewing. For example, it is common to capture an image using a digital camera and then immediately display the captured image on a display screen associated with the digital camera. This ability to immediately view the image is commonly referred to as "instant review." The ability to immediately review the recaptured image allows the user to immediately decide whether the image is satisfactory and worth keeping. The image may then be printed at a later time.

Many characteristics for determining whether the image is satisfactory may not be readily visually noticeable on the small display associated with many digital cameras. The displays used on the cameras typically are not able to display an image with the clarity of a printed image. Therefore, the user may not be able to determine whether image quality was optimized simply by viewing the image displayed on the display. For example, while the image may appear to be in focus and exposed properly when viewed on the camera display, the image may appear out of focus and improperly exposed when it is printed. Unfortunately, printing the image is a time consuming and costly way to determine whether an image is satisfactory.

SUMMARY

A method of analyzing images captured using an imaging device is provided herein. The analysis provides suggestions for changing a parameter of the imaging device during subsequent image capture.

DETAILED DESCRIPTION

Devices and methods for analyzing images are described herein. The devices and methods described herein analyze image data that is representative of images. The devices and methods for analyzing images may be implemented in hardware, software, firmware, or a combination thereof. In one embodiment, the system and method for analyzing images are implemented using a combination of hardware, software or firmware that is stored in a memory and that is executable by a suitable instruction execution system. In the embodiments described herein, the device is a digital camera wherein software stored on hardware in the camera analyzes image data or otherwise instructs the digital camera to analyze image data.

The hardware portion of the system and method for analyzing a captured image can be implemented with any or a combination of the following technologies, which are all well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc. The software portion of the system and method for analyzing a captured image can be stored in one or more memory elements and executed by a suitable general purpose or application specific processor.

The software for analyzing images, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means, which contain, store, communicate, propagate, or transport the program for use by or in connection with the instruction execution system, apparatus, or device.

Figure 1:
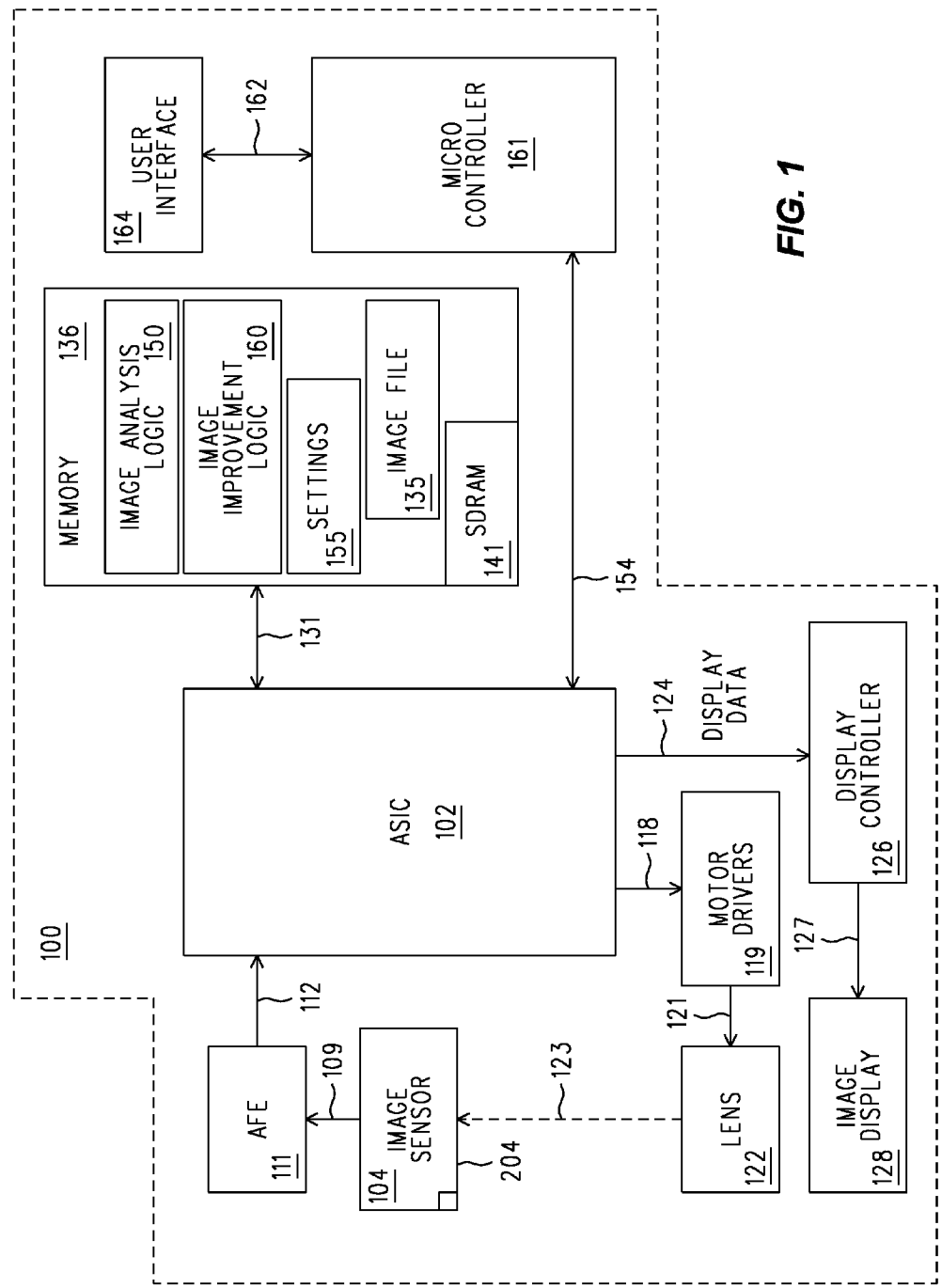
FIG. 1 is a block diagram illustrating an embodiment of a digital camera.

FIG. 1 is a block diagram illustrating an embodiment of a digital camera 100, which is sometimes referred to herein simply as a camera 100. In the implementation to be described below, the digital camera 100 includes an application specific integrated circuit (ASIC) 102 that executes the image analysis logic 150 described herein. As will be described below, the image analysis logic 150 can be software that is stored in memory and executed by the ASIC 102. In an alternative embodiment, the image analysis logic 150 maybe be implemented in firmware, which can be stored and executed in the ASIC 102. Further, while illustrated using a single ASIC 102, the digital camera 100 may include additional processors, digital signal processors (DSPs) and ASICs. It should be noted that the ASIC 102 may include other elements, which have been omitted. As described in greater detail below, the ASIC 102 controls many functions of the digital camera 100.

The camera 100 includes an image sensor 104. The image sensor 104 may comprise a charge coupled device (CCD) or an array of complementary metal oxide semiconductors (CMOS), which are both arrays of light sensors. Both the CCD and the CMOS sensor includes a two-dimensional array of photosensors, which are sometimes referred to as pixels. The pixels convert specific wavelengths or colors of light intensities to voltages that are representative of the light intensities. In one embodiment, higher pixel values or voltages are representative of higher intensities of light and lower pixel values are representative of lower intensities of light.

In one embodiment of the camera 100, the image sensor 104 captures an image of a subject by converting incident light into an analog signal. The analog signal is transmitted via a connection 109 to an analog front end (AFE) processor 111. The analog front end processor 111 typically includes an analog-to-digital converter for converting the analog signal received from the image sensor 104 into a digital signal. The analog front end processor 111 provides this digital signal as image data via a connection 112 to the ASIC 102 for image processing.

The ASIC 102 is coupled to one or more motor drivers 119 via a connection 118. The motor drivers 119 control the operation of various parameters of the lens 122 via a connection 121. For example, lens controls, such as zoom, focus, aperture and shutter operations can be controlled by the motor drivers 119. A connection 123 between the lens 122 and the image sensor 104 is shown as a dotted line to illustrate the operation of the lens 122 focusing on a subject and communicating light to the image sensor 104, which captures the image provided by the lens 122.

The ASIC 102 also sends display data via a connection 124 to a display controller 126. The display controller may be, for example, a national television system committee (NTSC)/phase alternate line (PAL) encoder, although, depending on the application, other standards for presenting a display data may be used. The display controller 126 converts the display data from the ASIC 102 into a signal that can be forwarded via a connection 127 to an image display 128. The image display 128, which, as an example may be a liquid crystal display (LCD) or other display, displays the captured image to the user of a digital camera 100. The image display 128 is typically a color display located on the digital camera 100.

Depending on the configuration of the digital camera 100, the image shown to a user on the image display 128 may be shown before the image is captured and processed, in what is referred to as "live view" mode, or after the image is captured and processed, in what is referred to as "instant review" mode. In some embodiments, a previously captured may be displayed in what is referred to as "review" or "playback" mode. The instant review mode is typically used to display the captured image to the user immediately after the image is captured and the playback mode is typically used to display the captured image to the user sometime after the image has been captured and stored in memory.

The instant review mode allows the user of the camera 100 to immediately view the captured image on the display 128. Unfortunately, because the image display 128 is typically small, only gross features, or characteristics, of the image can be visually observed. Furthermore, the image display 128 may not accurately reproduce color, tint, brightness, etc., which may further make it difficult for a user to determine the quality of the captured image. The difficulty in visually determining the quality of the captured image leads to the possibility of saving an image that may include deficiencies that, if visually detected, would likely cause the user to discard the image and attempt to capture another image having better quality. In order to determine whether the image includes deficiencies that may not be apparent to the user when viewing the captured image on the image display 128 in the instant review mode, the image analysis logic 150 dynamically analyzes one or more characteristics of the captured image. The analysis logic 150 then presents the user, via the image display 128 and a user interface, an analysis of the captured image. An exemplary dynamic analysis of the data for each pixel in a captured image is described below with reference to FIG. 2. In one embodiment, information associated with each pixel may be analyzed to determine whether a significant number of the pixels forming the image are either black or white. A predominance of white pixels may be indicative of overexposure and a predominance of black pixels may be indicative of underexposure.

Similar dynamic analyses can be performed to determine whether an image is in focus or to determine the white balance the image is correct. In one embodiment of determining whether an image is in focus, pixels in an image are examined to determine whether sharp transitions exist between pixels. For example, a black pixel adjoining a white pixel may indicate that the image is in focus, while a black pixel separated from a white pixel by a number of gray pixels may indicate that the image is out of focus.

White balance is a characteristic of the image that generally refers to the color balance in the image to ensure that white portions of the image appear white. An image in which each pixel is a different shade of the same color may indicate an image in which the white balance is improperly adjusted.

Further, an image improvement logic 160 may be provided to present to the user a recommendation in the form of instructions presented on the image display 128 on ways in which to possibly improve a subsequent image. For example, the image improvement logic may suggest adjusting a condition under which the image was captured or adjusting a setting or parameter used to capture the image. As will be described below, in one embodiment the image analysis logic 150 analyzes the captured image and, optionally, the camera settings used to capture the image, and determines a value of one or more characteristics of the captured image. For example, to determine whether the exposure of the image is satisfactory, if a predefined number of white pixels in the image is exceeded, then the image analysis logic 150 may indicate that the image is overexposed. Further, if the image analysis logic 150 determines that one or more characteristics of the captured image is not satisfactory to yield a high quality image, the image improvement logic 160 may determine whether a condition used to capture the image should be adjusted, or whether a camera setting should be adjusted, to improve a subsequent image. For example, if the image analysis logic 150 determines that the image is underexposed, the image improvement logic 160 may determine that a subsequent image may be improved by activating the camera flash for a subsequent image.

When the image analysis logic 150 analyzes the data representing the captured image and the setting used to capture the image, the analysis can be used by the image improvement logic 160 to suggest adjustments to the settings to improve a subsequent image. These suggested adjustments to the camera settings or parameters can be presented to the user on a help screen via the image display 128, or, in an alternative configuration, can be automatically changed for a subsequent image.

It is noted that the image analysis logic 150 and the image improvement logic 160 may be a single unit. For example, they may exist in the same firmware or be a single computer program. They have been split into separate functions herein solely for illustration purposes.

The ASIC 102 is coupled to a microcontroller 161 via a connection 154. The microcontroller 161 can be a specific or general purpose microprocessor that controls the various operating aspects and parameters of the digital camera 100. For example, the microcontroller 161 may be coupled to a user interface 164 via a connection 162. The user interface 164 may include, for example but not limited to, a keypad, one or more buttons, a mouse or pointing device, a shutter release, and any other buttons or switches that allow the user of the digital camera 100 to input commands.

The ASIC 102 is also coupled to various memory modules, which are collectively referred to as memory 136. The memory 136 may include memory internal to the digital camera 100 and/or memory external to the digital camera 100. The internal memory may, for example, comprise flash memory and the external memory may comprise, for example, a removable compact flash memory card. The various memory elements may comprise volatile, and/or non-volatile memory, such as, for example but not limited to, synchronous dynamic random access memory (SDRAM) 141, illustrated as a portion of the memory 136 and flash memory. Furthermore, the memory elements may comprise memory distributed over various elements within the digital camera 100.

The memory 136 may also store the image analysis logic 150, the image improvement logic 160, the settings file a 155 and the various software and firmware elements and components (not shown) that allow the digital camera 100 to perform its various functions. The memory also stores an image file 135, which represents a captured image. When the system and method for analyzing an image is implemented in software, the software code (i.e., the image analysis logic 150) is typically executed from the SDRAM 141 in order to enable the efficient execution of the software in the ASIC 102. The settings file 155 comprises the various settings used when capturing an image. For example, the exposure time, aperture setting (f-stop), shutter speed, white balance, flash on or off, focus, contrast, saturation, sharpness, ISO speed, exposure compensation, color, resolution and compression, and other camera settings may be stored in the setting file 155. As will be described below, the setting file 155 may be accessed by the image analysis logic 150 to analyze a captured image by, in one example, determining the camera settings used to capture the image that is under analysis.

The ASIC 102 executes the image analysis logic 150 so that after an image is captured by the image sensor 104, the image analysis logic 150 analyzes various characteristics of the captured image. These characteristics may include characteristics of the captured image, or alternatively, may include the settings used to capture the image. Further, if the image improvement logic 160 determines that the image could be improved by changing one or more of the conditions under which the image was captured, or by changing one or more camera settings, then the image improvement logic 160 can either suggest these changes via the user interface 164 and the image display 128, or can automatically change the settings and prepare the camera for a subsequent image. Embodiments of the analysis are described in greater detail below.

Figure 2:
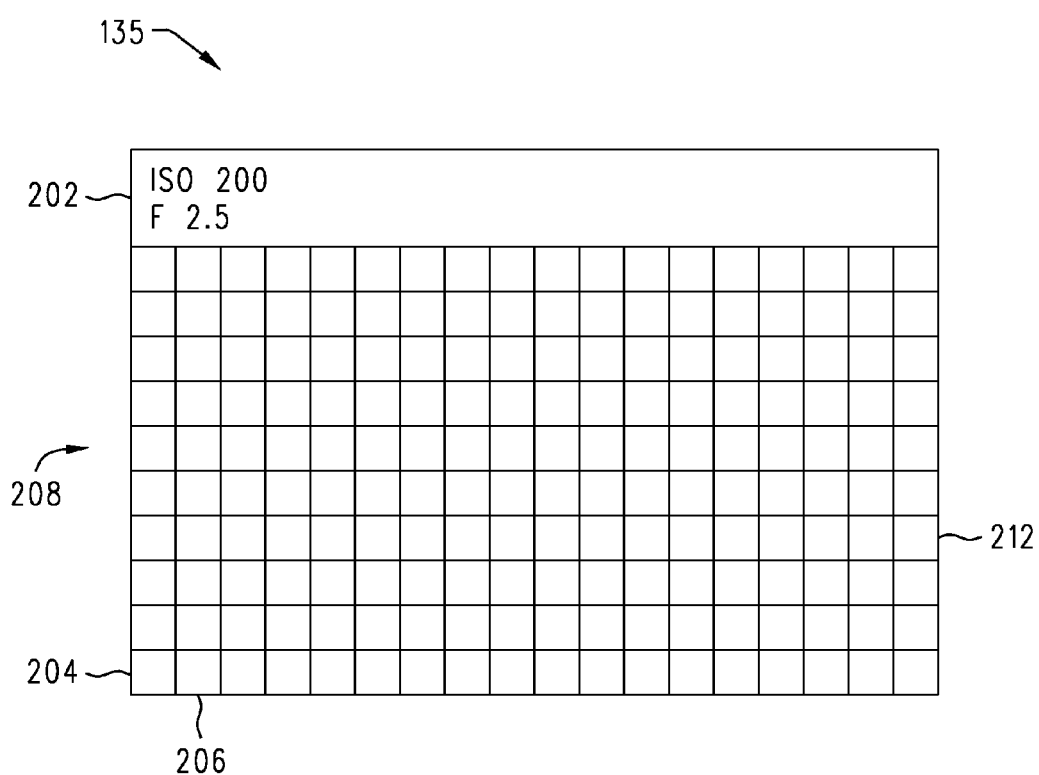
FIG. 2 is a graphical illustration of an embodiment of an image file.

FIG. 2 is a graphical illustration of an image file 135. The image file 135 includes a header portion 202 and a pixel array 208. The header portion or other portion may include data, sometimes referred to herein as metadata, that indicates settings of the camera or conditions in which the image was captured. The metadata may be analyzed to determine whether improvements to subsequent images may be made. The pixel array 208 comprises a plurality of pixels or pixel values, exemplary ones of which are illustrated using reference numerals 204, 206 and 212. Each pixel in the pixel array 208 represents a portion of the captured image represented by the image file 135. An array size can be, for example, 2272 pixels wide by 1712 pixels high. When processed, the image file 135 can also be represented as a table of values for each pixel and can be stored, for example, in the memory 136 of FIG. 1. For example, each pixel has an associated red (R), green (G), and blue (B) value. The value for each R, G and B component can be, for example, a value between 0 and 255, where the value of each R, G and B component represents the color that the pixel has captured. For example, if pixel 204 has respective R, G and B values of 0, 0 and 0, respectively, (or close to 0,0,0) the pixel 204 represents the color black, or is close to black. Conversely, for the pixel 212, a respective value of 255 (or close to 255) for each R, G and B component represents the color white, or close to white. R, G and B values between 0 and 255 represent a range of colors between black and white.

The data for each pixel in the image file 135 can be analyzed by the image analysis logic 150 to determine characteristics of the image. For example, characteristics including, but not limited to, the exposure, focus or the white balance of the captured image can be analyzed. A predominance of white pixels may be indicative of overexposure and a predominance of black pixels may be indicative of underexposure. To determine whether an image is in focus, pixels in an image are analyzed to determine whether sharp transitions exist between pixels. For example, a black pixel adjoining a white pixel may indicate that the image is in focus, while a black pixel separated from a white pixel by a number of gray pixels may indicate that the image is out of focus. An image in which each pixel is a different shade of the same color may indicate a problem with the white balance of the image. An example of determining the exposure will be described below with respect to FIG. 3.

Figure 3:
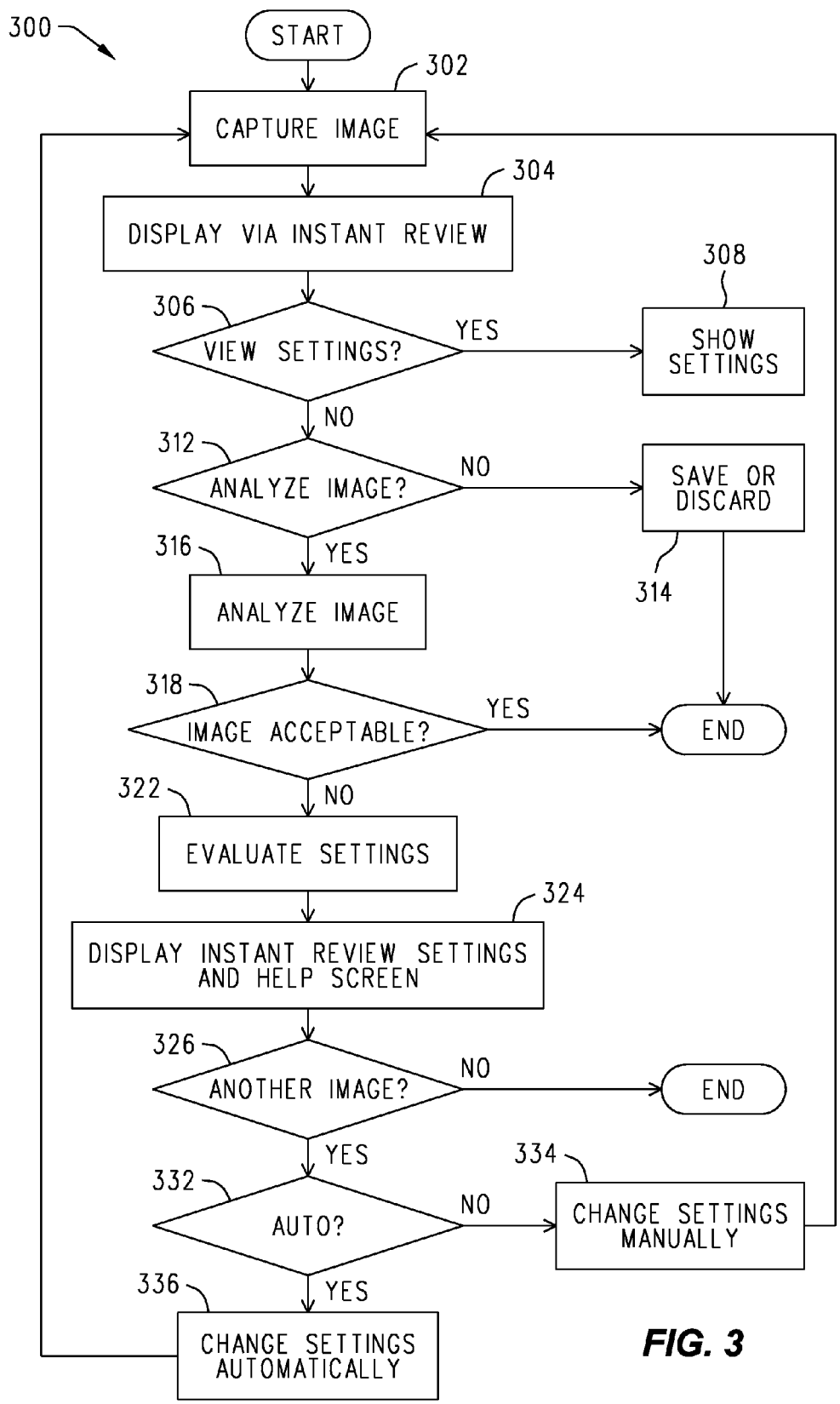
FIG. 3 is a flow chart describing the operation of an embodiment of the image analysis and improvement logic of FIG. 1.

FIG. 3 is a flow chart 300 describing the operation of an embodiment of the image analysis logic 150 and the image improvement logic 160 of FIG. 1. Any process descriptions or blocks in the flow chart to follow should be understood as representing modules, segments or portions of code which include one or more executable instructions for implementing specific logical functions or steps in the process, and alternative implementations are included within the scope of the preferred embodiment. For example, functions may be executed out of order from that shown or discussed, including substantially concurrently or in reverse order, depending on the functionality involved, as would be understood by those reasonably skilled in the art of the present invention.

In block 302 the image sensor 104 of FIG. 1 captures an image. The image is stored in the memory 136 as image file 135. In block 304, the image represented by the image data is displayed to the user of the digital camera 100 via the image display 128 of FIG. 1 during the "instant review" mode. The instant review mode affords the user the opportunity to view the captured image subsequent to capture.

In decision block 306, the user determines whether he or she wants to view the settings with which the image was captured. If the user wants to view the settings, the settings are displayed to the user on the image display 128 as indicated in block 308. If the user does not want to view the settings, then, in decision block 312, it is determined whether the user wants the image analysis logic 150 to analyze the image. If the user does not want the image to be analyzed, then, in block 314 the image can be saved or discarded. Alternatively, the image analysis logic 150 can be invoked automatically without user intervention.

In block 316, the image analysis logic 150 analyzes the data within the image file 135. The data is analyzed to determine various characteristics of the captured image. The following example will use exposure as the characteristic that is analyzed by the image analysis logic 150. However, other characteristics, such as, focus and white balance, can be analyzed. Analysis of several of these other characteristics will be described in greater detail below.

When analyzing exposure, the image analysis logic 150 performs a pixel by pixel analysis to determine whether the image includes a predominance of either black or white pixels. It should be noted that rather than sampling all the pixels constituting the image, a sample of the pixels may be analyzed. In this example, the data associated with each pixel in the image file 135 is analyzed to determine whether a pixel is a black pixel or a white pixel. Each pixel is analyzed to determine its corresponding R, G and B values. For example, if the R, G and B values for the pixel 204 are all zeros, the pixel is considered a black pixel. Each pixel in the pixel array 208 is analyzed in this manner to determine the number of black or white pixels in the pixel array 208 for this image file. A determination in block 306 that a substantial portion of the pixels in the array 208 are black indicates that the image is likely underexposed. Conversely, a determination that many of pixels in the array 208 are white indicates that the image is likely overexposed. Of course the image may be of an all white or an all black subject, in which case the user may choose to disregard the analysis.

In an alternative embodiment, the data in the image file 135 can be analyzed in combination with other data available either in the image file 135 or from the settings file 155 in the camera 100. For example, additional data, sometimes referred to as metadata, saved in the header 202 of the image file 135 can be analyzed in conjunction with the information from each pixel in the array 208. This information might include, for example, the ISO setting and the aperture setting (f-stop) used to capture the image. These data items can be used in conjunction with the pixel data above to develop additional information regarding the characteristic of the analyzed image. Analysis of the settings will be described in greater detail below.

Furthermore, the image analysis logic 150 can also analyze the camera settings used to capture the image and use those settings when analyzing the data in the image file 135 to develop additional data regarding the image file 135. For example, the image analysis logic 150 can access the settings file 155 in the memory 136 of FIG. 1 to determine, for example, whether the flash was enabled, or to determine the position of the lens when the image was captured. In this manner, the image analysis logic 150 can gather a range of information relating to the captured image to perform an analysis on the captured image file 135 to determine whether the captured image meets certain criteria. To illustrate an example, if the image analysis logic 150 determines that the image is underexposed, i.e., the image file contains many black pixels, the image analysis logic 150 can access the settings file 155 to determine whether the flash was active when the image was captured. If the image analysis logic 150 determines that the flash was turned off, the image analysis logic 150 may communicate with the image improvement logic 160 to recommend that the user activate the flash so that a subsequent image may have less likelihood of being underexposed. It should be noted that the settings file 155 may be appended to the image file 135.

In decision block 318, it is determined whether the image data analyzed in block 316 represents an acceptable image. This can be an objective determination based on criteria that the user enters into the camera 100 via a user interface 164, FIG. 1, or can be preset in the camera 100 at the time of manufacture. Alternatively, the determination of whether the image data represents an acceptable image can be a subjective determination based on user input. If the image is determined to be acceptable, then no further calculations or analysis are performed.

If, however, in decision block 318 the image analysis logic 150 determines that certain conditions under which the image was captured or settings used to capture the image can be changed to improve the image, then, in block 322, the image improvement logic 160 evaluates the settings used to capture the data in the image file 135 to determine whether a condition or setting can be changed to improve the image. In addition, the image improvement logic 160 can also develop recommendations to present to the user of the camera to improve a subsequent image. For example, if the analysis in block 316 suggests that the image was underexposed, the image improvement logic 160 may develop "advice" to be presented to the user. In this example, as will be described below, the image improvement logic 160 may suggest that the user activate the flash to improve a subsequent image. This suggestion may be provided to the user via the image display 128 in conjunction with the user interface 164.

In block 324, an instant review settings and help screen is displayed to the user. The instant review and help screen may include, for example, a thumbnail size display of the image, a display of the setting used to capture the image, an evaluation of the image and, if the user desires, suggestions on ways to improve the image. The evaluation of the image may include, for example, a notification that characteristics, such as exposure, focus and color balance are satisfactory. Suggestions on ways in which to improve the image may be communicated to the user via the image display 128 and may include, for example, changing a condition under which the image was captured, changing a setting with which the image was captured, or a combination of both changing a condition and a setting.

In decision block 326, the user determines whether another image is to be captured. If the user does not want to capture another image, the process ends. If, however, in decision block 326, the user wants to capture another image, then, in decision block 332, it is determined whether the user wants to manually change a parameter, such as a condition or setting, for the subsequent image or, if the parameter is to be set automatically the digital camera 100, FIG. 1.

If, in decision block 332, the user decides to manually change the setting, then, in block 334, the user changes the setting and the process returns to block 302 where another image is captured and the process repeats. If, however, in decision block 332, the user wants the digital camera 100 to automatically change the setting, then, in block 336, the setting used to capture the previous image are changed according to the new setting determined in block 324. The process then returns to block 302 to capture a subsequent image.

Having described some embodiments of analyzing characteristics of an image and camera settings, other embodiments will now be described.

In the following embodiments, the data in the header 202, FIG. 2, of an image fife 135 is sometimes referred to as metadata. As described above, the metadata may include several characteristics related to the camera settings at the time the image was captured. These settings may be settings adjusted manually by the user or automatically by the camera. In some embodiments of the image analysis logic 150, the metadata, and not the data representative of the pixels 208, is analyzed.

It should be noted that the following analysis provides determinations of some of the possible anomalies that may be detected by the image analysis logic 150. Thus, fewer or more possible anomalies may be detected.

Exposure Errors

Several possible exposure errors or anomalies may be detected by analyzing the metadata and the image data. Several methods may be used to determine these possible exposure errors. For example, as described above, the pixel values may be analyzed to determine whether a preselected number of pixel values are above or below preselected values. The metadata may also be analyzed to determine the camera settings and ambient conditions at the time the image was captured to determine if the camera settings were proper. It is noted that the time of image capture refers to a time in which the digital camera generated image data.

Over Exposure in Aperture Priority Mode

Figure 4:
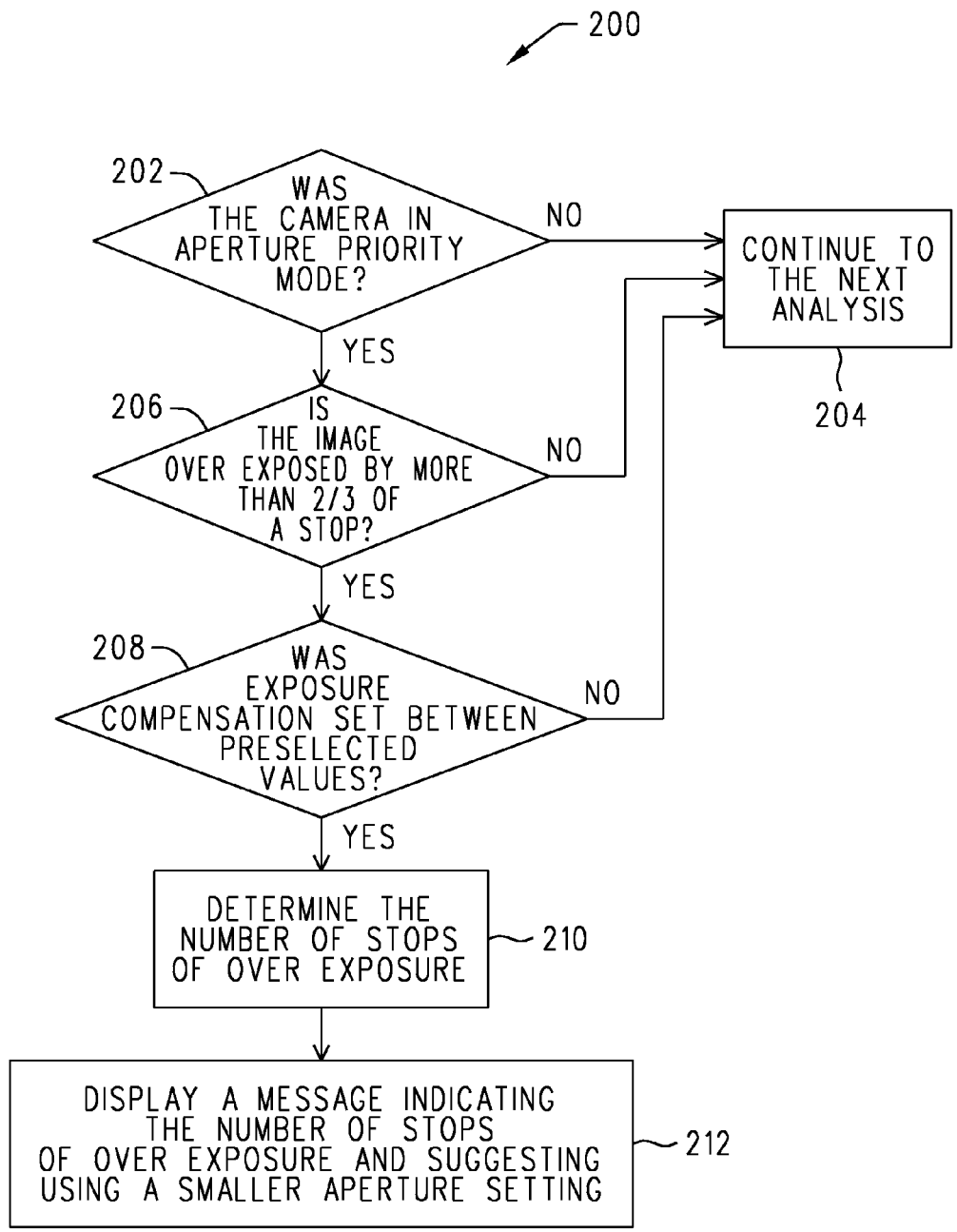
FIG. 4 is a flowchart describing an embodiment of detecting over exposure errors and suggesting corrections thereto.

Reference is made to FIG. 4, which is a flowchart 200 describing an embodiment of detecting over exposure errors and suggesting corrections to overcome the errors. In summary, the embodiment of the method set forth in FIG. 4 suggests corrections when the image is over exposed by more than a predetermined amount and the camera is in aperture priority mode. Aperture priority mode enables a user to select an aperture setting during image capture. In this embodiment of the digital camera, the digital camera may have the above-described aperture priority mode and another mode wherein the digital camera selects an aperture to use during image capture.

In decision block 202, a decision is made as to whether the camera was in aperture priority mode during image capture. As described above, aperture priority mode enables a user of the camera to manually select an aperture setting. Data stored in the metadata may indicate whether the camera was in aperture priority mode during image capture. If the camera is not in aperture priority mode, processing proceeds to block 204 where processing continues to the next analysis. More specifically, the suggestion ultimately offered by the flowchart 200 will not be applicable to the camera setting when the camera is not in aperture priority mode. If the camera is in aperture priority mode, the analysis continues to decision block 206.

In decision block 206, a decision is made as to whether the image is over exposed by a predetermined amount. For example, the image may be analyzed to determine if the exposure is greater than a preselected stop value. In the embodiment of the flow chart 200, the decision block 206 determines whether the image is over exposed by more than two-thirds of a stop. It should be noted that other values of the stop may be used in the decision block 206. If the image is not over exposed by more than the preselected stop value, processing continues to block 204 as described above. If the image is over exposed by more than the preselected stop value, processing continues to decision block 208 as described below.

In decision block 208, a determination is made as to whether the image is over exposed by more than a preselected value. In one embodiment, the preselected value corresponds to two-thirds stop. It should be noted that in other embodiments, determinations may be made as to whether the exposure is between preselected values and an indication may be provided as to the amount of overexposure. A suggestion that the image may be over exposed may be provided by also determining an exposure compensation values set during generation of the image data. In one embodiment, the decision block 208 determines whether the exposure compensation is between plus and minus 0.6. It is noted that an exposure compensation of a value other than zero is indicative of a manual user setting. In this embodiment, if the exposure compensation is not within the preselected values, processing proceeds to block 204 as described above. If the exposure compensation is within the preselected values, processing proceeds to block 210.

At this point, it has been determined that the image is over exposed by a preselected number of stops and the camera is in aperture priority mode. In addition, in this embodiment, the exposure compensation is not within preselected values. Block 210 then determines the number of stops the image is over exposed. For example, the pixel values may be analyzed to determine the amount of over exposure. Based on the foregoing, block 212 causes the camera to display information related to correcting the over exposure problem. In the embodiment of the flowchart 200, the information informs the user of the stop value of the over exposure and suggests using a smaller aperture setting, which relates to a larger f-number. Block 212 may also suggest using an automatic mode, wherein the camera selects the aperture and possibly the exposure compensation.

Under Exposure in Aperture Priority Mode

Figure 5:
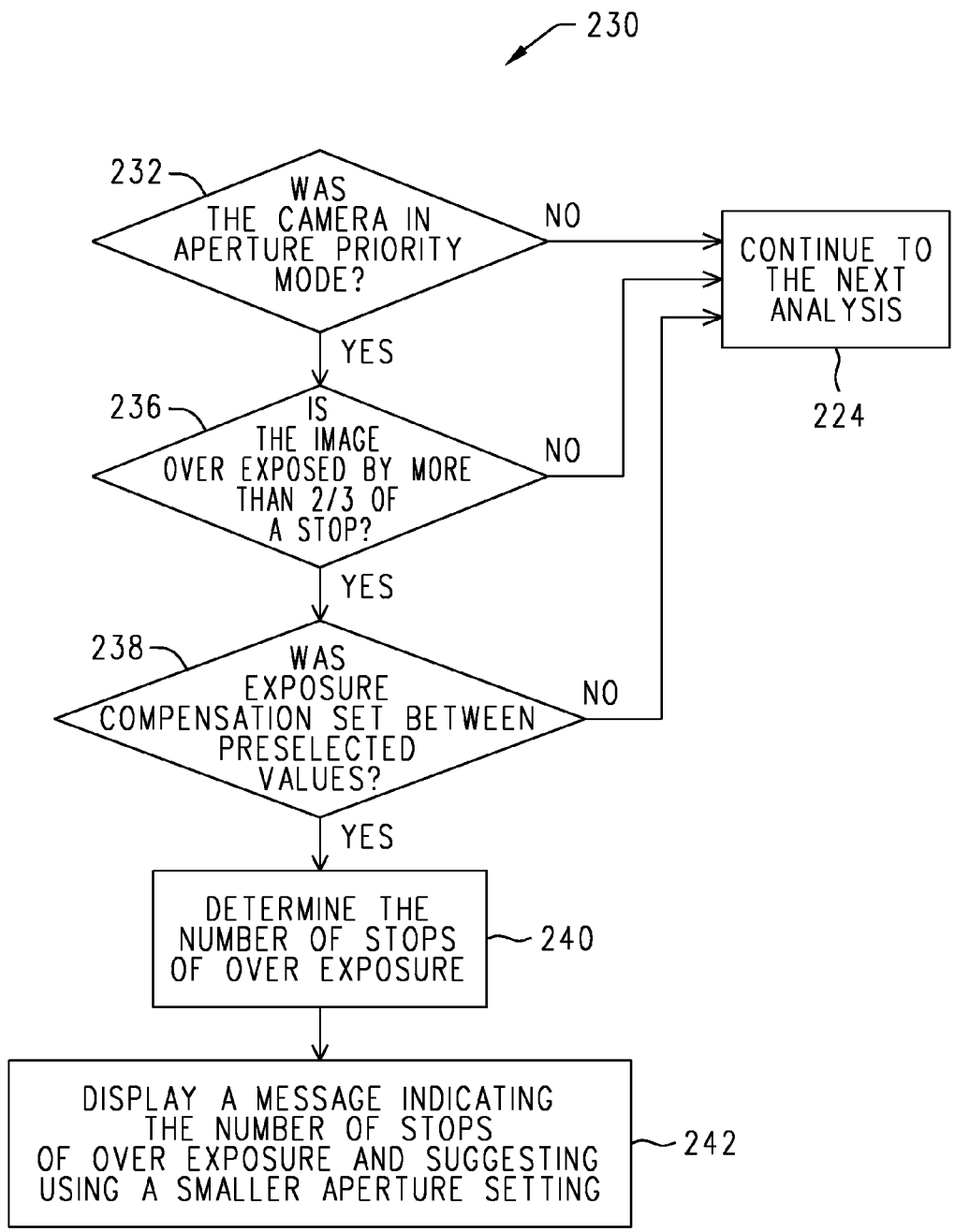
FIG. 5 is a flowchart describing an embodiment of detecting under exposure errors and suggesting corrections thereto.

Reference is made to FIG. 5, which is a flowchart 230 describing an embodiment of detecting under exposure errors and suggesting corrections thereto. In summary, the method set forth in FIG. 54 suggests corrections when the image is under exposed by more than a predetermined amount and the camera is in aperture priority mode. In one embodiment, the under exposure corresponds to two-thirds stop and in another embodiment, the under exposure corresponds to one stop.

In decision block 232, a decision is made as to whether the camera was in aperture priority mode during the generation of image data. Data stored in the metadata may indicate whether the camera was in aperture priority mode. If the camera was not in aperture priority mode during generation of the image data, processing proceeds to block 234 where processing continues to the next analysis. More specifically, the suggestion for improving image quality ultimately offered by the flowchart 220 will not be applicable to the camera setting. If the camera was in aperture priority mode, the analysis continues to decision block 236.

In decision block 236, a decision is made as to whether the image is under exposed by a predetermined amount, which may be a preselected stop value. In the embodiment of the flow chart 230, the decision block 236 determines whether the image is under exposed by more than two thirds of a stop. It should be noted that other under exposure values, such as one stop, may be used in the decision block 236. If the image is not under exposed by more than the preselected stop value, processing continues to block 234 as described above. If the image is under exposed by more than the preselected amount, processing continues to decision block 238 as described below.

As with over exposure, an indication of under exposure may be assisted by analyzing an exposure compensation setting during the generation of image data. In the embodiment of the analysis of FIG. 5, such an analysis is performed in decision block 238 where a determination is made as to whether the exposure compensation was within preselected values. It should be noted that in other embodiments, determinations may be made as to whether the exposure compensation is greater or less than preselected values. In one embodiment, the decision block 238 determines whether the exposure compensation is set to zero. It is noted that an exposure compensation of a value other than zero is indicative of a manual user setting. If the exposure compensation is not within the preselected values, processing proceeds to block 234 as described above. If the exposure compensation is within the preselected values, processing proceeds to block 240. It should be noted that in some embodiments, exposure compensation is not analyzed.

At this point, it has been determined that the image is under exposed by a preselected number of stops and the camera was in aperture priority mode during generation of the image data. In addition, in this embodiment, the exposure compensation was not within preselected values. Block 240 determines the number of stops the image is under exposed. Based on the foregoing, block 242 causes the camera to display information related to correcting the under exposure problem. In the embodiment of the flowchart 230, the information informs the user of the stop value of the under exposure and suggests using a larger aperture setting, which relates to a smaller f-number. Block 242 may also suggest setting the camera to automatic mode as described above.

Over Exposure in Time Value Mode

The analysis of the metadata and image data may determine that the image is over exposed and the camera is in a time value mode. Time value mode is sometimes referred to as Tv mode. The time value mode enables a user to select the shutter speed of the camera, which determines the exposure time during image capture. More specifically, the shutter speed determines the amount of time that the photosensors charge during image capture. If the shutter speed is set too slow, the image may be over exposed. Likewise, if the shutter speed is set too fast, the image will be under exposed.

Figure 6:
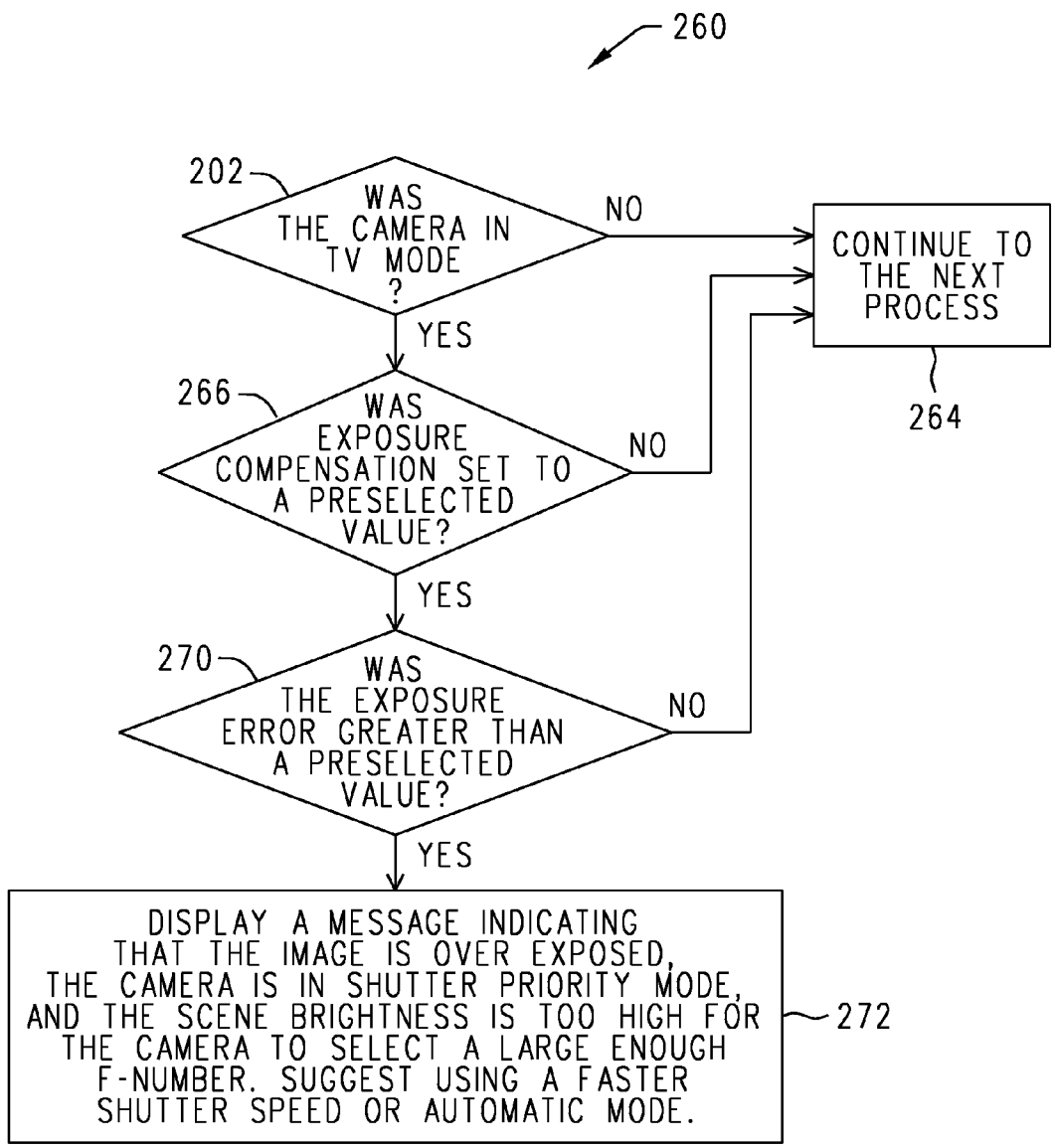
FIG. 6 is a flowchart describing an embodiment of analyzing an image that is over exposed and that was captured using time value mode.

An embodiment of analyzing an image to determine whether the image is over exposed due to an improper setting in time value mode is shown in the flow chart 260 FIG. 6. At decision block 262, a determination is made as to whether the camera was in time value mode during image capture. The decision as to whether the camera was in time value mode during image capture may be made by analyzing the metadata associated with the image. If the camera was not in time value mode, the following analysis is not relevant and processing proceeds to block 264. Block 264 simply directs the processing to analyze other possible problems with the captured image.

As stated above, in some embodiments, the setting of exposure compensation at the time of image capture may provide insight to exposure problems. In the embodiment of FIG. 6, exposure compensation is analyzed at decision block 266, where a determination is made as to whether the exposure compensation was set to a preselected value. The decision as to whether the exposure compensation is set to a preselected value may be made by analyzing the metadata associated with the image. In one embodiment, the decision block 266 determines whether the exposure compensation is set to zero. In other embodiments, the decision block 266 may determine if the exposure compensation is greater than or less than preselected values or between preselected values. In the embodiment of FIG. 6, if the result of decision block 266 is negative, then processing proceeds to block 264 because, the analysis does not have bearing on the camera settings. In some embodiments, exposure compensation is not analyzed.

If the result of decision block 266 is affirmative, processing continues to decision block 270. It is noted that in order for processing to reach decision block 270, the camera is in time value mode and the exposure compensation is either at, below, above, or between preselected values. Decision block 270 determines whether the exposure error is greater than a preselected value, meaning that the image is overexposed. If the image is not overexposed, processing proceeds to block 264 as described above. If the image is overexposed, processing proceeds to block 272. As described above, the pixel values may be analyzed to determine if the image is over exposed.

Block 272 displays information regarding the image. Many different embodiments of the information may be displayed. In one embodiment, the information informs the user that the image is overexposed. The information may also include the amount of the overexposure and a suggestion that the scene brightness was so high that the camera could not select an appropriate F-number. A suggestion of a faster shutter speed or using an automatic mode may be provided to the user. Block 272 may also suggest setting the camera to automatic mode.

Under Exposure in Time Value Mode

The analysis of the metadata and image data may determine that the image is under exposed and the camera is in a time value mode. The analysis may be the same as with the flow chart 260 and the description provided above, except a determination at block 270 may determine that the image is under exposed. It follows that the suggestions to correct the problem would be the opposite as those provided at block 272. For example, the information may indicate that the scene brightness was too low for the camera to select a low enough F-number. The suggestion may include using a slower shutter speed or an automatic mode. As with block 272, a suggestion may be made to use the automatic mode of the camera.

Bracketing Problems

Some embodiments of the camera include a bracketing mode, which enables users to capture a plurality of images using different settings. More specifically, the camera captures a series of images using at least one preselected range of settings. For example, the camera may capture three images wherein each image has a different exposure compensation. A user may select the best image from the plurality of captured images. The camera may determine that some errors occurred while using the bracketing mode and may suggest procedures to correct the errors during subsequent image captures.

Exposure Compensation is Set to Great

In one embodiment, the exposure compensation is set to great to use the bracketing mode properly. More specifically, the absolute value of the exposure compensation may be too great to use the bracketing mode properly. This determination may be made by analyzing the metadata to determine if the exposure compensation is greater or less than preselected values. In one embodiment, the determination is made if bracketing is set and the metadata indicates that the exposure compensation is set to a value of greater than 2.3 or a value less than −2.3.

If the above conditions are met, the camera may inform the user of the problem. For example, the camera may suggest setting the exposure compensation to a value closer to zero or using the automatic mode.

More Over Exposure May be Desired

In one embodiment of bracketing, the user may want an image to be extremely over exposed. The camera may analyze metadata and image data to determine that the camera was set to over expose images and that further over exposure may be achieved. In such an embodiment, the images may be captured using varying shutter speeds or ISO speeds. The varying shutter speeds may be set slow which would cause the images to be over exposed. The image data may be examined to determine if it is over exposed. If so, the camera may suggest using a greater exposure compensation during generation of subsequent image data.

In a similar embodiment, the exposure of the image may have encountered a maximum value during the bracketing sequence. Thus, more than one image would be similar. In order to take better advantage of the bracketing, the camera may suggest lowering the exposure compensation during the bracketing sequence. Therefore, the images will vary from one to another. For example, the camera may determine that exposure compensation was set greater than 2.3 and that ten percent of the pixel values are greater than a preselected value. The camera may suggest lowering the exposure compensation to a value between plus and minus 2.0 during the subsequent bracketing sequence. In one embodiment, the camera determines that a maximum exposure of 3.0 stops was obtained during the bracketing sequence and recommends the above-described changes during the subsequent bracketing sequence.

More Under Exposure May be Desired

In an embodiment similar to the above-described embodiment, the camera may detect that a user wanted greater under exposure during a bracketing sequence. For example, the shutter speed or ISO speed may be set fast so as to cause under exposure. More than one image captured during the bracketing sequence may have reached the maximum under exposure of the camera, so the full use of the bracketing sequence may not be realized. For example, more than one image may be under exposed by a maximum of the camera of 3.0 stops.

As with the section above, the camera may suggest reducing the exposure compensation during a subsequent bracketing sequence. For example, the camera may suggest setting the exposure compensation to values of between plus and minus 2.0 during a subsequent bracketing sequence.

Clipped and Dark Pixel Values

For the following embodiments, pixel values are analyzed to determine if they are clipped or dark. Clipped pixel refer to pixel values that are at a maximum or saturated value. Clipped pixel values may be indicative of an image that is over exposed. Dark pixel values are indicative of an under exposed image. During bracketing, clipped or dark pixels are indicative of the exposure of the image being too light or too dark.

Figure 7:
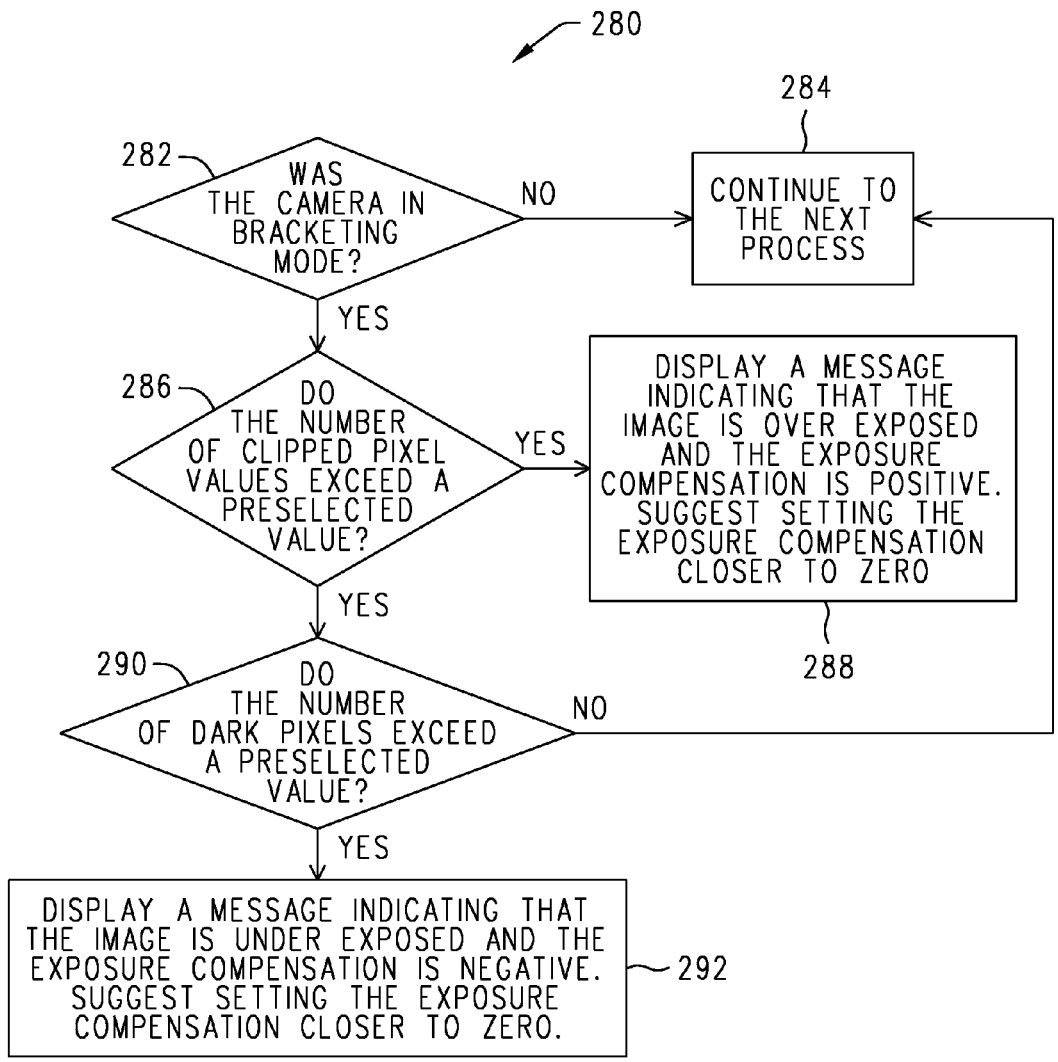
FIG. 7 is a flowchart describing an embodiment of analyzing an image for exposure wherein the image was captured using bracketing.

One embodiment of analyzing the exposure of an image captured using bracketing is shown by the flow chart 280 of FIG. 7. In decision block 282, a determination is made as to whether the camera is in bracketing mode. The bracketing mode may capture a plurality of images using different shutter or ISO speeds. Block 282 may determine if the bracketing mode enables exposure compensation of plus or minus 0.7 or greater. If the camera is not in bracketing mode, processing proceeds to block 284 where other possible problems with the captured image are analyzed. If the camera is in bracketing mode, processing proceeds to decision block 286 where a determination is made as to whether the number of clipped pixels exceed a preselected value. The number of clipped pixels may be determined by counting the number of pixel values in the image file that are saturated or that exceed a preselected value. In some embodiments, block 286 determines if the number of clipped pixel values exceed three percent.

If the determination from decision block 286 is affirmative, processing proceeds to block 288. More specifically, if the number of clipped pixels exceeds the preselected value, the captured image is probably over exposed. Block 288 displays information related to the image being over exposed. In one embodiment, a message is displayed indicating that the image is over exposed and suggests setting the exposure compensation closer to zero during a subsequent bracketing sequence. The exposure compensation may also be set to automatic mode.

If the determination of decision block 286 is negative, processing proceeds to decision block 290. Decision block 290 determines whether the number of dark pixels in the image file exceed a preselected number. The number of dark pixel values may be determined by counting the number of pixel values that are zero or that are less than a preselected number. In some embodiments, decision block 290 determines if greater than ten percent of the pixel values are less than a preselected value. If the determination of decision block 290 is negative, processing proceeds to block 284 as described above. If the determination of decision block 290 is positive, processing proceeds to block 292. Block 292 causes the camera to display information similar to block 288. However, block 292 may indicate that the exposure compensation is negative and that the image is under exposed. The suggestion is to adjust the exposure compensation closer to zero. Again, the suggestions may also include using the automatic mode.

Strobe Required in Bracketing Mode

One problems that may be analyzed is a situation where one of a plurality of images captured during bracketing mode required a strobe, which did not activate, and the other images did not require the strobe. This situation may be indicative of a blurry image. More specifically, during bracketing mode, if the nominal image does not require a strobe, the other images may be captured without the strobe. If the camera determines that one of the images, other than the nominal image, required a strobe, it may indicate that the shutter speed dropped below the hand held limit for the desired zoom. The hand held limit is a function of the zoom and the shutter speed and represents the limit to which a typical user is able to hold the camera and capture an image without the image being blurred. The hand held limit may be reached by either a narrow or telephoto zoom or a long exposure time used during image capture. Either situation makes the image more susceptible to blurring caused by the user holding the camera, which may cause the camera to shake too much during image capture.

During analysis, the metadata of the images captured during the bracketing are analyzed. Based on the zoom and the exposure time, a determination within the camera may be made that the hand held limit had been reached during image capture. In addition, based on the metadata, a determination may be made that the strobe should have been activated. In this situation, the strobe was forced not to activate because of the bracketing. The determination could then be made that the image may be blurry. A suggestion may be offered to the user to use a tripod or other camera stabilizing device. Other suggestions may include turning the flash on for the entire bracketing sequence.

Exposure Compensation

Exposure Compensation Set Too High

In a first situation, the user captures images with the exposure compensation set to a positive value and the captured images are over exposed. In summary, an analysis concludes that the user may have forgotten that the exposure compensation is set to a positive value.

The metadata may be analyzed to determine if the image was captured while the exposure compensation was set to a positive value. In some embodiments, the analysis determines of the exposure compensation was set equal to or greater than 0.6. In addition, the number of clipped pixels may be compared to a preselected number to determine if the number of clipped pixels exceeds the preselected number. For example, the analysis may determine if the number of clipped pixels exceeds three percent. If the above-described conditions are met, the camera may display a message to the user indicating that the image may be over exposed and that the exposure compensation is set to high. The camera may suggest lowering the exposure compensation or setting it closer to zero. The camera may also suggest using an automatic exposure compensation mode.

Over Exposed or Under Exposure of the Subject

In this situation, the analysis indicates that the subject is over exposed or under exposed. The state of the exposure may be determined by sampling pixel values in a portion of the image. For example, pixel values from the center of the image where the subject is typically located may be analyzed. An excessive number of clipped or dark pixel values in a specific region relative to another region may indicate that the subject is over exposed or under exposed.

In one embodiment, the metadata is analyzed to determine that the camera was not in aperture priority mode and the subject, as described above, is under exposed. In such a situation, the subject may be backlit and the light meter may have measured the background rather than the subject. The analysis may indicate that the subject is under exposed. The solution suggested to the user may be to increase the exposure compensation to a positive number such as +0.3. The processing program may also suggest forcing the flash on if the subject is within a preselected range, such as within ten feet of the camera.

In another embodiment, the metadata is analyzed to determine that the camera is in automatic mode and the subject, as described above, is over exposed and the background is dark. In addition the metadata indicates that the strobe did not activate during image capture. The processing program may indicate that the subject is over exposed. The solution suggested to the user may be to reduce the exposure compensation to a negative number.

Exposure Problems in Spot Mode

In some embodiments, the processing program analyzes exposure problems with the image wherein the image was captured using spot mode. Spot mode relates to the portion of an image use by the camera during focusing and setting up exposure for the remainder of the image. In spot mode, the portion is typically very small. The determination as to whether the camera was in spot mode during image capture may be determined by analyzing the metadata. Over exposure or under exposure problems in certain portions of the image may be detected by analyzing the pixel values.

In one embodiment, the analysis uses the center of the image to determine if it is dark and if surrounded by bright areas. Such a situation may indicate to the user that the image is over exposed. The processing program may also indicate that the image was captured using spot mode and that the camera relied solely on the dark portion to calculate exposure. Thus, the remaining portion of the image is not properly exposed. The camera may suggest setting the metering to average or center-weighted. The camera may also suggest using an automatic mode. The camera may also suggest using a wider portion of the image during focusing and setting up exposure.

In another embodiment, the image is analyzed as being light in the center and dark in the surrounding areas. As described above, this situation may be detected by analyzing the pixel values corresponding to various portions of the image. If such a situation is detected, the processing program may indicate that the image appears to be under exposed. The processing program may also indicate that the image was captured using the spot mode and that the camera did not use dark regions on the edge of the scene to calculate exposure. The camera may suggest setting the metering to average or center-weighted. The camera may also suggest using a wider portion of the image for focusing and exposure settings.

Under Exposed Image

The program may find many situations in which an image is or may be under exposed. In the following situation, the scene may be relatively dark and the strobe may not have activated during image capture. In order to compensate for the dark scene, the camera may select a slow shutter speed during image capture. However, the camera may not have a shutter speed slow enough to properly expose the image of the relatively dark scene. The program may determine that the image is under exposed by analyzing the pixel values as described above. The program may also analyze the shutter speed during image capture, which may be stored in the metadata. If the camera does not have a slower shutter speed, the program may suggest using a higher ISO or a wider zoom. The wider zoom may cause the aperture to open a little wider. The camera may also suggest illuminating the scene.

Focus Errors

Focus Problems Due to an Unstable Camera

Figure 8:
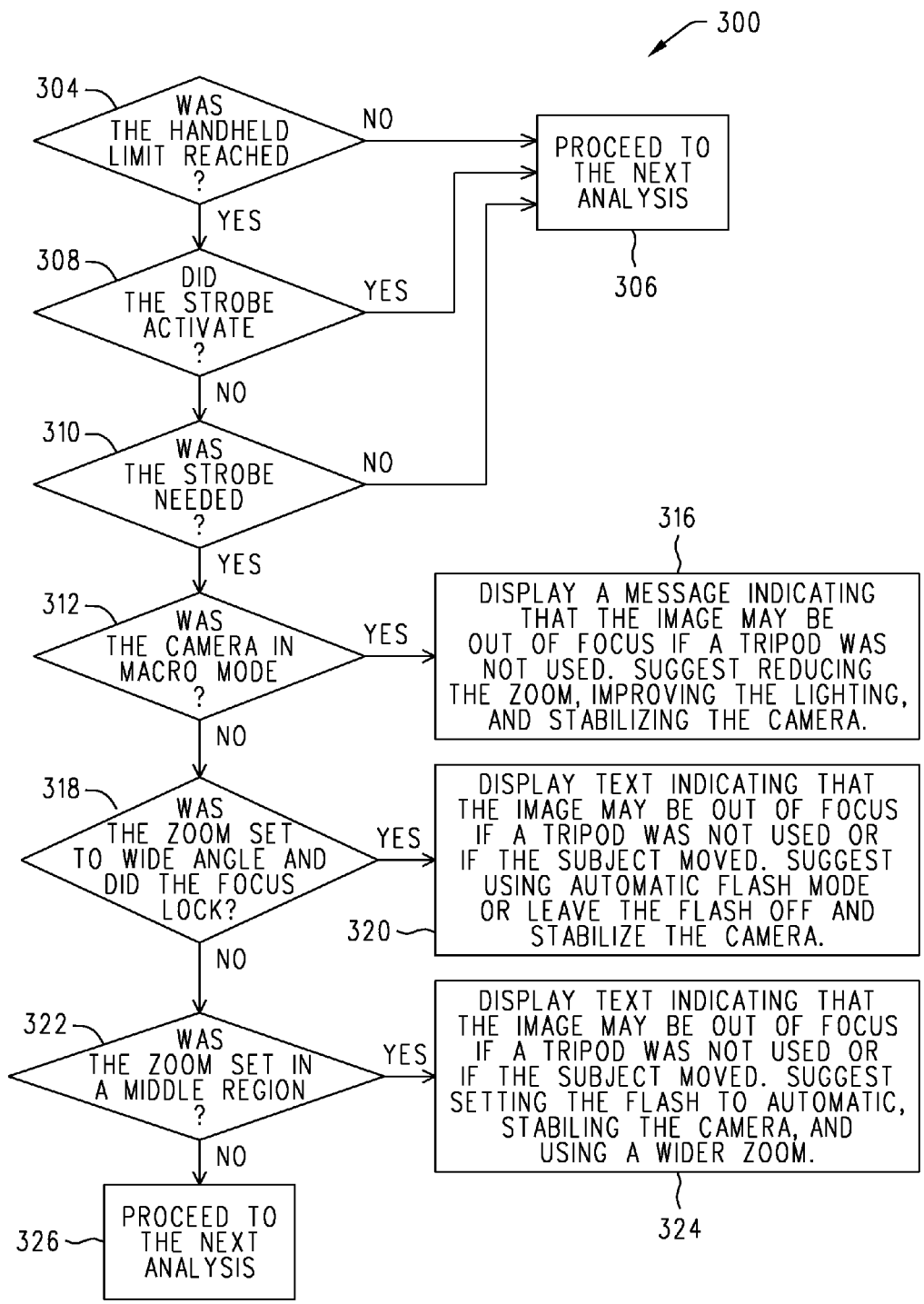
FIG. 8 is a flowchart describing embodiments for analyzing an image for blur when the handheld limit has been exceeded and the strobe was not activated.

The processing program may analyze several items in the metadata to determine that the image may be blurry due to shaking of the camera at the time the image was captured. An embodiment for determining whether the image may be blurry is shown in the flowchart 300 of FIG. 8. Other methods of detecting focus problems due to shaking are described further below.

Some portions of the flowchart 300 and the methods described therein describe the handheld limit of the camera. As set forth above, the handheld limit is a function of zoom and exposure time. The basis for the handheld limit is that a user of a camera that holds the camera is going to shake the camera during image capture, which is going to blur the image. The camera may be programmed with a handheld number or limit, which may be based on the amount of shaking a typical user shakes while holding the camera. It is noted that a longer exposure time or greater zoom increases the handheld calculation closer to or beyond the handheld limit.

At decision block 304, a determination is made as to whether the handheld limit has been reached. If the hand held limit has not been reached, meaning that the shaking caused by a user probably did not affect the image, processing proceeds to block 306. As noted above, the hand held limit refers to a function of exposure time and zoom setting, and may include other variables. At block 306, the processing continues to analyze another aspect or potential problem with the image because conditions were not met to proceed with the following analysis.

At decision block 308, a determination is made as to whether the strobe or flash activated. If the strobe activated, processing proceeds to block 306 as described above. If the strobe activated, then the camera likely compensated for low light conditions and the following analysis is not relevant. If the strobe did not activate, processing proceeds to decision block 310 where a determination is made as to whether the strobe should have been activated. For example, the image may have been captured under low light conditions wherein the strobe was forced not to activate. It should be noted that the hand held limit may be reached if the strobe activated. Thus, in some embodiments, determinations may be made that the hand held limit was met even if the strobe activated during image capture.

If the above-described conditions are met, processing continues to decision block 312 where a determination is made as to whether the camera is in a macro mode. A macro mode is a mode wherein the user captures an image of an object that is significantly close to the camera. For example, the object may be located a few inches from the camera. If all the above-described conditions are met, the process may determine that the image could be out of focus and may proceed to block 316. Block 316 displays information regarding the possible focus problem and suggestions to overcome the problem. For example, text indicating that the image may be out of focus if it was captured without stabilizing the camera may be displayed. In addition, suggestions of reducing the zoom, improving the lighting, and stabilizing the camera may be provided to the user.

If the determination of decision block 312 is negative, processing proceeds to decision block 318 where a determination is made regarding the zoom setting used during image capture. More specifically, decision block 318 determines whether the zoom was set to a wide angle during image capture. The determination may be made by comparing the setting of the zoom to a preselected value, wherein a zoom setting below the preselected value constitutes a wide angle zoom setting. If the determination of decision block 318 is affirmative, processing proceeds to block 320, where text is displayed to indicate a possible problem with the image. The text may indicate that the image may be out of focus if it was captured if a tripod or the like was not used to stabilize the camera during image capture. Suggestions for correcting the problem may also be displayed and include using an automatic flash or strobe mode and stabilizing the camera during image capture.

If the determination from decision block 318 is negative, processing proceeds to decision block 322. At decision block 322, a determination is made as to whether the zoom setting of the camera during image capture was in a middle region. This may be accomplished by determining whether the zoom was set between two preselected values which represent the middle range of the zoom setting. If the determination of decision block 322 is affirmative, processing proceeds to block 324. At block 324, text is displayed to suggest that a problem exists with the image and to offer suggestions for improving the image. For example, the text may indicate that the image may be out of focus if it was captured without stabilizing the camera or if the subject was moving. In order to improve a subsequent image, the text may suggest setting the flash to automatic mode, stabilizing the camera, and using a wider zoom.

If the determination of decision block 326 is negative, processing proceeds to block 326, which is similar to block 306. In summary, the analysis could not determine any problems with the image and the next parameter will be analyzed. It should be noted that block 326 may never be reached if the zoom settings of decision blocks 312, 318, and 322 encompass all possible zoom settings.

Focus Problems in Burst Mode

As set forth above, the image may be blurred or otherwise out of focus if it is determined that the handheld limit has been exceeded. Blurring may be more prominent in burst mode, which causes several images to be captured within a preselected period. The strobe is typically not activated in burst mode because it does not have time to charge between image captures. Thus, if the images are captured in low light conditions, the shutter speed is slowed, which increases the likelihood that the hand held limit will be reached.

Figure 9:
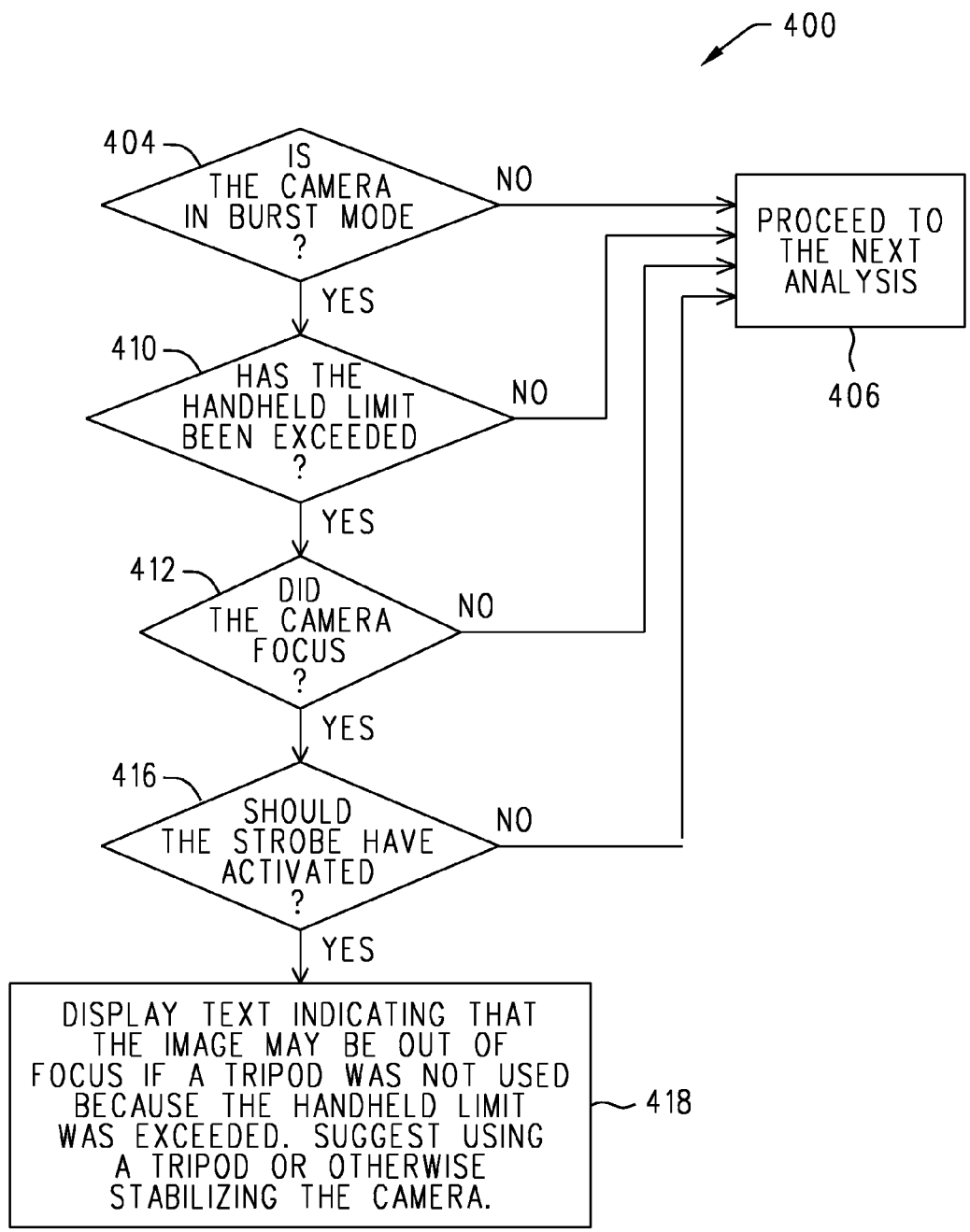
FIG. 9 is a flowchart describing embodiments for analyzing an image for blur when the image was captured using the burst mode, the handheld limit was exceeded, and the strobe was not activated.

An embodiment of analyzing focus problems in burst mode is provided in the flowchart 400 of FIG. 9. The flowchart of FIG. 9 is based on an embodiment wherein the strobe is disabled during burst mode. In decision block 404 of the flowchart 400, a determination is made as to whether the camera was in burst mode during image capture. If the determination of decision block 404 is negative, processing proceeds to block 406. At block 406, it is determined that the remaining analysis has no bearing and processing proceeds to the next analysis. If the determination of decision block 404 is affirmative, processing proceeds to decision block 410 where a determination is made as to whether the handheld limit was exceeded during image capture. As described above, the metadata may be analyzed to determine if the handheld limit has been exceeded. If the determination of decision block 410 is negative, processing proceeds to block 406 as described above.

If the determination of decision block 410 is affirmative, processing proceeds to decision block 412. Decision block 412 determines if the camera focused at the time the user captured the image. Again, if the determination of decision block 412 is negative, processing proceeds to block 406 as described above. The decision as to whether the camera focused at the time of image capture is sometimes referred to as whether the "focus lock" was achieved, indicating that the focus of the camera was at a preselected threshold during image capture.

If all the above-described conditions have been met, processing proceeds to decision block 416 where a determination is made as to whether the strobe would have otherwise activated during image capture. In other words, the determination of decision block 416 determines if the scene was illuminated dim so that the strobe would have activated, except the camera was in burst mode. In one embodiment of the camera described herein, the camera includes sunset mode, which is used to capture images in low light conditions. For example, the shutter speed may be relatively slow. The metadata may be analyzed to determine if the camera was in sunset mode when the image was captured. In such situations, the strobe would typically activate but for the camera being in burst mode. If the camera was in sunset mode, the image may be blurred because of the low light conditions and because the strobe was not activated. There may be other embodiments of the camera which cause the strobe to be inactive during image capture. For example, macro modes and modes to image documents may cause the strobe to be disabled.

If the conditions set forth above are met, processing proceeds to block 418. Block 418 displays text on the camera indicating that the image may be out of focus if a tripod or other stabilizing device was not used during image capture. The text may indicate that the image was captured during low light conditions with the strobe forced off due to the burst mode. Accordingly, the exposure time was long and may have exceeded the handheld limit. A suggestion of using a tripod or otherwise steadying the camera during image capture may be provided to the user. The camera may also suggest using a strobe, which may require capturing images on a mode other than burst mode. In another embodiment, the camera may suggest widening the zoom. As described above, a narrow zoom increases the likelihood of reaching the hand held limit.

If the determination from decision block 416 is negative, processing proceeds to block 406 because the present analysis has no bearing on the image quality.

No Focus Lock During Image Capture

Some embodiments of the camera include a switch that is used to cause the camera to capture images. The switch may be in a first position when no pressure is applied. The switch may be in a second position when a first force is applied. The second position is typically achieved when a user presses lightly on the switch. The second position cause the camera to focus on a scene. Because the focusing may take a while, the user may have to maintain the switch in the second position for a period while the camera focuses. Many cameras provide a focus indicator, which provides the user with an indication as to whether focus has been achieved or not. Application of more force cause the switch into a third position, wherein the third position causes the camera to generate image data.

If the switch is pressed too fast, the camera may not achieve focus before an image is captured. The status of the focus may be stored in the metadata associated with each image. In some embodiments of the camera, the program analyses the metadata to determine if focus was achieved prior to the generation of image data. In some embodiments, the time that the switch was maintained in the second position may provide an indication as to the status of the focus. For example, if the switch was rapidly pressed from the first position to the third position, the rapid pressing may have caused the camera to shake during image capture, which may blur the image. Thus, if the camera found that focus lock was not achieved or if the switch was pressed too fast, the program may indicate that the image may be blurry.

In one embodiment, the camera suggests slowing down the speed in which the switch was pressed. For example, the camera may suggest maintaining the switch in the second position until focus lock is achieved. The camera may also suggest attempting to focus on a high contrast portion of the scene. High contrast portions of a scene usually provide better references for focus. In some embodiments, the camera may focus faster if the lighting in the scene is intensified. Thus, the program may suggest increasing light intensity during generation of subsequent image data.

Camera Set to Focus at Infinity—Image Out of Focus

Many camera embodiments include different focus ranges. In one embodiment, the camera includes a close focus and an infinity focus. The close focus, in this embodiment, enables the camera to focus on objects between a first distance from the camera to infinity. The infinity focus enables the camera to focus on objects located between a second distance from the camera and infinity, wherein the second distance is greater than the first distance. A camera may also include a manual focus mode wherein a user manually focuses the camera.

The program may analyze the focus of the camera by analyzing the metadata to determine whether the camera obtained focus lock during generation of the image data. The program may also analyze the focus setting to determine the focus mode of the camera during generation of the image data. If the camera was set to infinity focus during generation of the image data and the camera was unable to focus, the program may suggest using the close focus mode during generation of subsequent image data. The close focus mode increases the range of focus of the camera so that there is a better chance of obtaining focus lock during generation of subsequent image data. Likewise, if the camera was set to manual focus and did not achieve focus lock, the program may suggest using an automatic focus mode wherein the close focus and infinity focus modes are automatic focus modes.

The above-described analysis may also apply to a macro mode, wherein the macro mode enables the camera to focus on objects located in close proximity to the camera. If the camera detects an object within the range of the macro mode, but detects that the camera was not set to focus in macro mode during generation of the image data, the program may suggest using another focus mode or moving further away from the object during generation of subsequent image data. The program may also suggest stabilizing the camera during generation of subsequent image data because use of the macro mode increases the possibility of encountering the above-described hand held limit. In another embodiment, the program may suggest reducing the aperture size when the camera is in a macro mode.

Blurry Image—Focus Assist Indicator Deactivated

Some embodiments of the camera include an indicator that provides an indication when focus lock is achieved. The indicator is sometimes referred to as a focus assist indicator. Several versions of the indicator may be provided in the camera. For example, an LCD screen may provide an indication as to the status of the focus lock. In another embodiment, a light may change color depending on whether or not focus lock is achieved. In low light conditions, the light may irritate the user, so the user, in some embodiments, may disable the light. A problem occurs if the user attempts to capture images with the light disabled because the user may not know whether the camera has achieved focus lock.

The status of the indicator may be stored in the metadata. The status may include whether the indicator was disabled during generation of image data and whether the camera achieved focus lock. If the indicator was disabled, the program may suggest enabling the indicator during generation of subsequent image data. In one embodiment, the program may analyze the ambient light intensity and determine that the focus indicator should be enabled if the ambient light intensity is low. As stated above, achieving focus may be difficult in low light conditions, so the program may suggest enabling the focus assist indicator so as to improve the changes of achieving focus lock. In yet another embodiment, the camera may provide the indication to enable the focus assist indicator if the camera did not achieve focus lock.

Strobe Errors

The program may analyze a variety of image problems related to the strobe. For example, the strobe may be activated when it is too close to a subject, which results in over exposure of the subject. The strobe may have an exposure compensation associated with it which may be set so as to cause over exposure or under exposure of an image. In other embodiments, the program may detect that an object blocked the strobe during image capture. Various strobe anomalies are described below.

Strobe Used Beyond its Range

The intensity of light emitted by the strobe that is able to effectively illuminate a subject decreases rapidly with distance. Thus, the strobe will not be effective when it is used to illuminate scenes or objects that are far away so as to be out of the range of the strobe. The effective distance of the strobe is a function of the zoom and other camera settings. In one embodiment, the camera analyzes the metadata to determine if the strobe was activated when the image was captured. The metadata or other data associated with an image may provide an indication as to the focal length of the camera when the image was captured. It follows that the zoom setting of the camera may be determined from the metadata or other data including the settings of other camera functions stored in the metadata. This information will determine if the camera was focused beyond the effective range of the strobe and may provide an indication as to the distance between the camera and the scene or object at the time of image capture. It is noted that other embodiments for measuring the distance between the camera and a scene or object may be used by the camera.

If a determination is made that the camera attempted to capture an image beyond the effective range of the strobe, the pixel values may be analyzed to determine if the image is under exposed. This may be achieved as described above by analyzing the number of pixel values that are at or below a predetermined value. If all the above-described conditions are met, a determination is made that the image may be dark or under exposed because it was captured with the subject beyond the effective range of the strobe. Text may be displayed indicating the reasons for the dark image. A suggestion may be provided that includes moving the camera and the subject closer or turning off the strobe and using a long exposure time. Other suggestions include increasing the exposure compensation of the strobe.

In other embodiments, the program may make the above-described suggestions if the program determines that other criteria are also met. For example, the program may require that the camera is in an automatic mode to select shutter speed. The program may also only display the above-described information if the ISO was set to four-hundred. Furthermore, the program may require that the strobe be activated or fired at full power during image capture.

Strobe Too Close to the Subject

As described above, the intensity of light emitted by the strobe that is able to effectively illuminate the subject is proportional to the distance between the camera and the subject. In some situations, the strobe may be too close to the subject and may cause the subject to be over exposed. In order to determine the distance between the strobe and the subject at the time the image was captured, the metadata may be analyzed. If the zoom was set to focus on a close subject or if the camera was set to a macro mode, it is assumed that the camera was located very close to the subject. It is noted that other methods may be used to determine the distance between the object or scene and the camera. The zoom may also be analyzed to determine if the lens was set to a magnification that is below a preselected value. If the above-described conditions are met, the camera may analyze the pixel values of the image to determine if a predetermined number of the pixel values are clipped or otherwise exceed a predetermined value. As described above, clipped pixel values are indicative of an over exposed image.

If the above-described conditions are met, the camera may display text indicating that the image is likely over exposed. The camera may suggest turning the flash off or moving the camera away from the subject during generation of subsequent image data.

In some embodiments, the program may require that other criteria be met before the above-described information is displayed. In one embodiment, the program may display the above-described information if the camera was set to automatic shutter speed. In another embodiment, the program may require that the exposure compensation be set to zero Image is Over Exposed Using the Strobe In other embodiments, the program may determine that the image is over exposed and the object was not excessively close to the camera during image capture. The program may analyze the pixel values as described above and may determine that the strobe activated during image capture. Based on these findings, the program may suggest a plurality of improvements to the image quality.

In one embodiment, the program determines that the strobe activated during image capture and the image is over exposed. The program may suggest turning off or deactivating the strobe during generation of subsequent image data. The program may analyze other settings of the camera at the time of image capture to determine that other settings or parameters of the camera, such as ISO speed, did not cause the over exposure.

In other embodiments, the program may analyze a strobe exposure compensation setting at the time of image capture. The value of this setting may be stored in metadata associated with the image data. The program may analyze the strobe exposure compensation. If the program determines that the strobe exposure compensation is too high, the program may suggest that the user use a lower value during generation of subsequent image data.

Under Exposed Image Using the Strobe

The program may analyze the metadata and other data to determine if the image is possibly under exposed. In one embodiment, the program may analyze the image to determine if it is under exposed. If so, the program may suggest increasing the strobe exposure compensation. Embodiments of this include increasing the power output of the strobe and the pulse time of the strobe. In other embodiments, the program may suggest using a wide angle lens, which may cause the aperture to open wider. In other embodiments, the program may suggest increasing the exposure compensation. For example, the program may suggest setting the exposure compensation to a positive value such as 0.3. In yet other embodiments, the program may suggest moving closer to the subject and reducing the ISO speed. For example, the user may move the camera to approximately 7.5 feet from the subject and setting the ISO speed to 100 or an automatic mode. In some embodiments, the program may provide the above-described information if the strobe activated at maximum power. The program may also require that the shutter speed be in automatic mode or that the ISO speed be 100 or less.

Strobe Used when the Camera is in Night Mode

The camera may have a mode that provides for capturing images captured under low light. This mode is sometimes referred to as night mode. Night mode typically increases the exposure time of the image, which may cause the hand held limit to be met. The program may determine that the camera was set to the night mode by analyzing the metadata. If the program determines that the camera was in night mode, the program may suggest stabilizing the camera to avoid blurring. The program may also cause information to be displayed indicating that the resulting image may be blurry.

In other embodiments, the program may cause the above-described information to be displayed if the program determines that the strobe activated, exposure time was greater than one sixtieth of a second, ambient light was low, or the camera focused.

Under Exposed Image Using Automatic Mode

In this analysis, the camera determines that the camera was set to automatic mode, meaning that the processor within the camera determined the best strobe setting. However, the camera also determined that the image is likely under exposed. In this analysis, the metadata determines that the camera was set in automatic mode and the strobe was activated during image capture. The pixel values are then analyzed as described above to determine if a predetermined number of pixel values are less than a predetermined number. More specifically, the image is analyzed to determine if it is possibly under exposed.

If the above conditions are met, the camera may display text indicating that the image may be under exposed. For example, the text may indicate that the strobe or flash likely did not provide adequate illumination for the ambient lighting conditions. The text may suggest overriding the automatic mode and setting the exposure compensation to a positive value, which will increase the exposure time during image capture. Thus, subsequent images may not be under exposed.

Object Blocking Strobe During Image Capture

The following analysis determines whether an object, such as the finger of the user, may have blocked the strobe during image capture. A blocked strobe will result in an under exposed image. In one embodiment of this analysis, the metadata is analyzed to determine if the focus distance used to capture the image was less than a predetermined distance, such as one meter. In such a situation, the subject of the image should be sufficiently illuminated so as not to generate an under exposed image. The metadata may also be analyzed to determine if the strobe was activated during image capture. If the above-described conditions are met, the camera may analyze the image to determine if it is under exposed by greater than a preselected amount, such as one stop. In other embodiments, the program may provide information to the user if no reflected light from the strobe is detected, indicating that the strobe did not illuminate the scene.

If the above-described conditions are met, the camera may display text indicating that the image was likely under exposed because an object, such as the finger of the user blocked the strobe. The text may suggest that the strobe be clear during subsequent image captures. The text may also suggest checking to make sure that the strobe is functioning.

Strobe Activated in Proximity of a Reflective Surface

When an image is captured using the strobe and the image includes a reflective surface, such as a window, the image may have a bright spot where the image of the reflected flash was captured. The method used to analyze this condition may consist of analyzing the metadata to determine whether the strobe was activated when the image was captured. Further analysis consists of determining whether the image has a bright spot. This analysis may be accomplished by analyzing the pixel values. If the pixel values indicate that a portion of the image is much brighter than other portions of the image, the camera may determine that the image contains a reflective surface. In some embodiments, the program may determine the intensity or amount of reflected strobe light in the scene. If the scene contains intense strobe light, the information described herein may be displayed.

If the above-described conditions are met, the camera may display text indicating that the image may have a bright spot caused by imaging the reflected flash. Suggestions for overcoming this problem include turning the flash off and imaging the reflective object at an angle so that the flash will not reflect directly back to the camera.

White Balance Errors

White balance errors, in summary, represent color variations due to different types of light sources illuminating a scene. For example, if a scene is illuminated with a flourescent ambient light, the colors in the scene have a specific temperature. The camera will then process the image data based on the selected illumination source. If the selected illumination source is not correct, the colors in the resulting image may be different than the scene illuminated with ambient light. This error is sometimes referred to as a white balance error.

User Selects Improper Illumination Source

In some embodiments of the camera, the user may select the illumination source or source of ambient light. For example, the user may select tungsten or flourescent lighting as the illumination source of the scene being captured. The camera may then capture an image and process image data based on the selected illumination source. If the camera is used to capture images that are illuminated using a different illumination source than the selected light source, the images may be susceptible to white balance errors.

Figure 10:
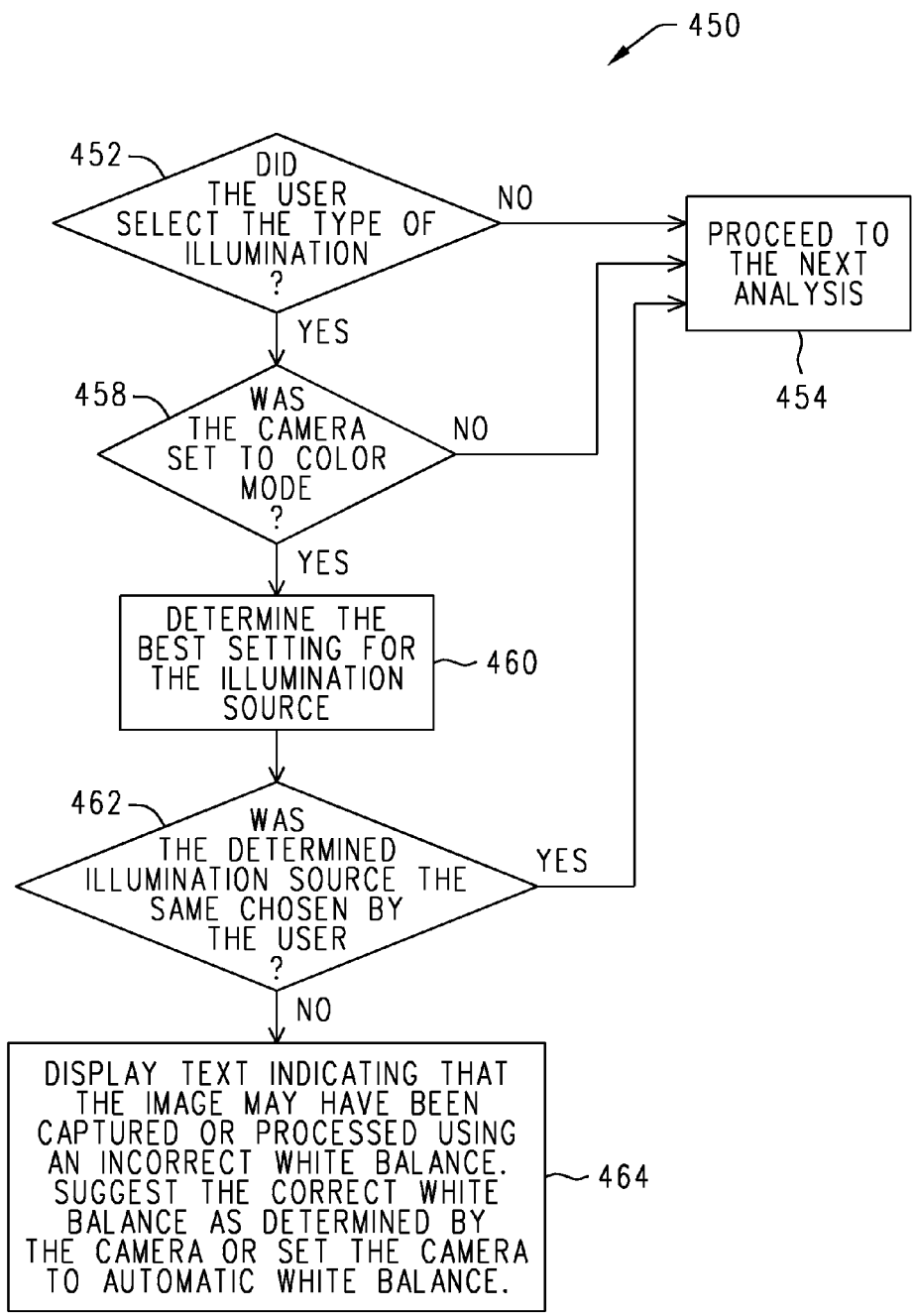
FIG. 10 is a flowchart describing an embodiment for analyzing an image for white balance errors.

The camera may analyze an image to determine if white balance errors may exist. One embodiment of determining if possible white balance errors exist is shown in the flowchart 450 of FIG. 10. At decision block 452, a determination is made as to whether the image was captured using a user selected illumination source. More specifically, the camera determines if the user provided information relating to the illumination source used to illuminate the captured scene. If the determination of decision block 452 is negative, processing proceeds to block 452 wherein the processing proceeds to the next analysis as described in the previous flowcharts.

If the determination of decision block 452 is affirmative, processing proceeds to decision block 458. At decision block 458, a determination is made as to whether the image was captured using full color mode. In this embodiment, the analysis focuses on color, so the analysis only proceeds if the full color mode is selected. The determination as to whether an image was captured while the camera was in full color mode may be made by analyzing the metadata. There is no need to perform this analysis if the image is a black and white image.

If the determination of decision block 458 is affirmative, processing proceeds to block 460. At block 460, the preferred illumination source is calculated or otherwise determined by the camera. More specifically, the camera determines which illumination source it would have chosen had the user not selected the illumination source. The analysis may be accomplished by analyzing the metadata and possibly other data to determine the preferred illumination source had the camera been in an automatic mode when the image was captured.

Processing then proceeds to decision block 462 where a determination is made as to whether the selected illumination source and the preferred illumination source are the same. In other words, a determination is made as to whether the camera would have selected the same illumination source as the user selected. If the camera would have selected the same illumination source that the user did, processing proceeds to block 454 as described above. In other words, there is no better choice for an illumination source than the one selected by the user and the processing continues to the next analysis.

If the illumination source selected by the user does not match the illumination source that the camera would have chosen, processing proceeds to block 464. Block 464 causes text to be displayed on the camera that indicates the image may have problems due to white balance errors. The text may indicate the selected illumination source and the preferred illumination source and may suggest changing the selected illumination source to the preferred illumination source. The text may also suggest changing the camera settings so that the camera automatically chooses the illumination source when processing the image data.

Several embodiments may be used in the white balance analysis. For example, the camera may enable a user to select various illumination sources from a list of illumination sources. The camera may assign a color temperature to each illumination source in the list. In some embodiments, the color temperatures are a ranges of color temperatures. During image capture, the camera may analyze the image and select a color temperature that it would use during processing.

The program may analyze the color temperature selected by the user and compare it to the color temperature selected by the camera. If the color temperature selected by the camera is the same or within a preselected range of the color temperature selected by the user, the analysis is complete and no suggestions are offered. If, on the other hand, the color temperature selected by the camera differs from the color temperature selected by the user, the program may inform the user that white balance problems may exist in the replicated image. The program indicate the color temperature selected by the camera. In another embodiment, the program may suggest a light source for the user to select based on the color temperature selected by the camera during subsequent image capture.

Numerous embodiments exist for selection of color temperature. For example, the user may select a color temperature corresponding to flourescent lighting. The camera may determine that a color temperature corresponding to tungsten lighting should have been selected. If the difference in color temperatures is greater than a preselected threshold, the program may suggest using the color temperature corresponding to tungsten lighting. As set forth above, the program may also provide information indicating that a white balance problem may exist.

Enhancements

The metadata and other data may be used to provide the user with ways to improve the image quality. The program may analyze the settings or different camera parameters at the time of image capture and may provide suggestions for improving the image during subsequent image capture.

Portrait Mode Enhancements

Portrait mode is a mode that is typically used for capturing images of people. The subjects are typically located in close proximity to the camera and, thus, are usually within range of the strobe. It is noted that there are many situations when the subject is out of range of the strobe.

One embodiment for enhancements determines whether the image was captured using portrait mode. This determination may be made by examining the metadata, which may store information relating to whether or not the camera was set in portrait mode at the time of image capture. If the camera was not in portrait mode, this portion of the analysis concludes because it is not applicable.

If a determination is made that the image was captured using portrait mode, a determination is made as to whether the strobe activated during image capture. The metadata may store information regarding whether or not the strobe activated during image capture. Images captured in portrait mode typically have higher quality if they are captured using the strobe. In such a situation, the camera may analyze the image data and determine that the strobe should have been activated. A message may be displayed indicating that the image may be enhanced by use of the strobe.

The camera may also determine whether a red eye elimination algorithm has been run on the image data. Such an algorithm removes red eye in images caused by capturing images of peoples' retinas. If such an algorithm did not run, the camera may suggest running such an algorithm. The red eye algorithm corrects the color of eyes. In one embodiment, the suggestion to run the algorithm may be displayed if the image was captured in portrait mode and the strobe activated during image capture.

In other embodiments, the camera may analyze other image parameters before suggesting the use of the strobe during image capture. For example, the exposure compensation or exposure time may be analyzed. As described above, the exposure compensation or time used during image capture may be stored in the metadata. If the exposure compensation is high or the exposure time is long, the camera may suggest using the strobe. The exposure time is typically selected by the camera. Therefore, if the exposure time is long, it is indicative of a dimly lit scene, which may require the strobe.

The camera may also analyze the number of dark pixels in an image. As described above, dark pixels are pixel values that are below a predetermined value and represent dark portions of an image. A large number of dark pixel values of an image captured using portrait mode may be indicative of an image having excessive shadows. Accordingly, the analysis may indicate to the user that the subject of the image may have undesired shadows. Therefore, the suggestions for an enhanced image may include using the strobe or setting the ambient lighting conditions used by the camera for image processing to a low light level.

The camera may also suggest using a low adaptive lighting setting. The low adaptive lighting setting reduces the effects of low light in the scene.

Too High Contrast in the Scene

The image data and the meta data may be analyzed to determine if the contrast in the scene is high or greater than a predetermined value. In one embodiment, the following analysis is not performed in panoramic or portrait modes. Images captured using the panoramic mode may have high contrasts due to the nature of capturing panoramic images. Images captured using the portrait mode may be subject to high contrast due to the nature of capturing portrait images.

The number of dark and clipped pixels in various portions of the image may be analyzed to determine the contrast. For example, pixel values in the center of the image may be analyzed to determine if they are generally greater than a predetermined value. Pixel values in other regions of the image may be analyzed to determine if they are generally less than a predetermined value. If a high number of pixel values are clipped and dark, the contrast may be too high. The camera may display information suggesting setting the camera to lower ambient lighting as a basis for image processing, which may lower the contrast.

In some embodiments, the program may suggest setting an adaptive lighting setting lower so as to capture images that may be located in shadows in the scene.

In other embodiments, the camera may analyze the metadata to determine if the subject is beyond the range of the strobe and if the camera focused during image capture. These addition criteria may have to be met in order for the camera to display the above-described suggestions.

Conflicting Settings

As described above, the camera may have a plurality of settings that may be automatic or may be set by a user. Problems may arise if users capture images using manual settings that conflict with one another. For example, if contrast, sharpness, saturation, and adaptive lighting are all set high, the resulting image may appear unrealistic.

In one embodiment, the camera determines if the contrast, sharpness, and saturation were all set high, or greater than preselected values, during image capture. In addition, the camera determines if the image was captured using a full color mode. All these settings may be stored in the metadata. If all the above-described conditions are met, the camera may display information indicating that the image may appear unrealistic. The program may display a suggestion of reducing at least one of the contrast, sharpness, or saturation settings.

In a similar embodiment, the camera determines if the contrast, sharpness, and adaptive lighting were all set high, or greater than preselected values, during image capture. In addition, the camera determines if the image was captured using a full color mode. All these settings may be stored in the metadata. If all the above-described conditions are met, the camera may display information indicating that the image may appear unrealistic. The program may display a suggestion of reducing at least one of the contrast, sharpness, or adaptive lighting.

In a similar embodiment, the camera determines if the contrast, saturation, and adaptive lighting were all set high, or greater than preselected values, during image capture. In addition, the camera determines if the image was captured using a full color mode. All these settings may be stored in the metadata. If all the above-described conditions are met, the camera may display information indicating that the image may appear unrealistic. The program may display a suggestion of reducing at least one of the contrast, saturation, or adaptive lighting.

In a similar embodiment, the camera determines if the sharpness, saturation, and adaptive lighting were all set high, or greater than preselected values, during image capture. In addition, the camera determines if the image was captured using a full color mode. All these settings may be stored in the metadata. If all the above-described conditions are met, the camera may display information indicating that the image may appear unrealistic. The program may display a suggestion of reducing at least one of the sharpness, saturation, or adaptive lighting.

In an embodiment related to the above-described analysis, the above-described analysis may only be performed if the camera was in focus when the image was captured. If the camera was not in focus, the analysis may have no bearing on the captured image. The determination as to whether the image was in focus may be made by analyzing the metadata, which may store data indicating whether the image was in focus.

ISO Speed and Adaptive Light Conflict

In one embodiment of the camera, the ISO speed and the adaptive lighting are analyzed to determine if a possible conflict existed during image capture. If the ISO speed is set above a preselected value and the adaptive lighting is also set above a preselected value, the camera may display information indicating that the image quality may be poor. For example, the camera may indicate that the image may appear grainy or unrealistic because both the ISO speed and the adaptive lighting are set above predetermined thresholds. The camera may also suggest lowering either the ISO speed or the adaptive lighting setting.

In one embodiment, the predetermined value or threshold speed for the ISO setting is 400 or gain greater than 29.0. The camera may suggest setting either the ISO setting or the adaptive lighting to the default values or setting the camera so that the camera selects the values. The camera may also determine whether it was in focus during image capture. If the camera was not in focus, the poor image quality may be due to focusing problems.

Camera is Too Hot

Like most electronic devices, the performance of a digital camera can deteriorate as it gets hot. For example, the CCD and the image processing components may produce an image that is degraded when they are operated above a predetermined temperature.

The camera may have a temperature sensor and may store the temperature of the camera at the time images are captured. For example, the temperature of the camera at the time of image capture may be stored in the metadata. In one embodiment, the temperature threshold is forty degrees centigrade. If the camera determines that the temperature is above the threshold, the camera may display information indicating that excessive heat may have caused the image to be degraded. The camera may further suggest cooling the camera down prior to capturing more images. Cooling may include turning off the display for a period prior to capturing images.

In one embodiment, the program measures the temperature of a CCD or the like that is used to generate image data. In another embodiment, the temperature of the camera may be calculated by determining the time period in which the display was active. Based on this calculation, the program may display the above-described information.

In a related embodiment, the program may analyze the adaptive lighting setting to determine if the camera temperature was above a preselected temperature during image capture and the adaptive lighting was set high. If the above-described conditions are met, the program may display information indicating that the image may be grainy or otherwise be poor quality. In order to improve subsequent images, the program may suggest reducing the adaptive lighting setting or turning it off. The program may also suggest reducing the temperature of the camera.

Portrait Mode Using Wide Angle

As described above, the portrait mode is typically used to capture images that are close to the camera. A wide angle setting of the lens, on the other hand, is typically used to capturing images or scenes over a wide angle, which are not close to the camera. Capturing an image in portrait mode while using a wide angle lens setting may distort the image. The metadata may store information relating to the zoom setting and whether the camera was in wide angle mode during image capture.

The zoom setting and portrait mode may be determined by analyzing the metadata. The zoom setting can be compared to a predetermined value to determine if the zoom setting was great enough to cause distortion in the image. Likewise, the metadata may be analyzed to determine if the image was captured using the portrait mode. If both these conditions are met, the camera may display information indicating that the image may be distorted. The camera may also suggest moving away from the subject and using a narrower zoom setting.

Action Mode with Shutter Lag

The camera may have an action mode, which is used to capture scenes containing moving subjects. Action mode typically includes a very fast shutter speed and other settings that enable the image of the subject to be captured without blurring the image. The metadata may contain information regarding whether an image was captured using action mode. One problem with capturing moving subjects is obtaining proper focus. As the subject moves, toward or away from the camera, the focal length changes. In order to enhance an image, the camera may detect that an image was captured using the action mode. The camera may suggest setting the focus at a point where the subject is expected to be during image capture. This will assure that the camera is properly focused during image capture.

In some embodiments, the camera may have a switch used to cause the camera to capture an image, wherein the switch has multiple positions. The switch may have a first position when not force is applied. In the first position, the functions associated with the switch may be inactive. A second position of the switch may be reached by applying a first force to the switch. The second position may cause the camera to focus on the scene. It is noted that focusing is typically not instantaneous and may require that the switch be maintained in the second position for a period. The third position of the switch may be achieved by applying a third force to the switch wherein the third force is greater than the second force.

The camera or program may measure the time that the switch is in the second position. Thus, the program is able to determine whether the camera likely achieved focus lock meaning that the camera was able to focus on a scene. If the time that the switch was in the second position was shorter than a preselected time and the camera was in action mode, the program may display information indicating that the image may be blurry. The preselected period may, as an example, be approximately 1.5 seconds. The program may also suggest maintaining the switch in the second position for a longer period during capture of subsequent images.

High Digital Zoom Resulting in Low Image Quality

The use of a digital zoom enables a camera user to enlarge a scene, however, the quality or resolution of the scene is degraded as a result. This degradation is more prominent when the user prints or otherwise displays an enlarged image. For example, if the user enlarges the scene to print it on a large sheet of paper, the resolution and, thus, the quality, of the image will be degraded. If the printed image is too large, the quality of the image will be significantly deteriorated. The digital zoom setting used to capture an image may be stored in the metadata. During analysis, the camera may access the metadata to determine the digital zoom setting and provide the user with information regarding possible printing limitations of the image before degradation exceeds a predetermined threshold.

In one embodiment, the camera determines whether the resolution of the captured image is less than one thousand columns. More specifically, the camera determines if less than one thousand columns of photodetectors on the CCD were used to capture the image. The camera may then display information indicating that the largest suggested image that may be reasonably replicated based on the image data is five inches by seven inches or thirteen centimeters by eighteen centimeters. The camera may also determine if less than eight hundred columns of photodetectors were used to capture the image. The camera may then display information indicating that the largest suggested image is four inches by six inches or ten centimeters by fifteen centimeters. The camera may also determine if less than one six hundred columns of photodetectors were used to capture the image. The camera may then display information indicating that the largest suggested image is three and one half inches by five inches or nine centimeters by thirteen centimeters.

Alternatively, the resolution used to capture an image may be increased. Therefore, the camera may suggest increasing the resolution, which increases the number of pixels used to capture an image. Therefore, larger images will be able to be replicated or displayed without degradation.

In another embodiment, the camera may suggest eliminating the digital zoom in favor of optical zoom.

What is claimed is:

1. A method of imaging an object, said method comprising:
   generating image data using an imaging device that includes a strobe and a zoom;
   determining if said strobe activated during said generating image data;
   determining an ambient light intensity during said generating image data;
   determining a zoom setting during said generating image data; and
   determining that said strobe should activate during generation of subsequent image data if said strobe did not activate during said generating image data, said ambient light intensity was less than a preselected intensity, and said zoom setting was at least one of wider than a first preselected value, between a first value and a second value, and narrower than a second preselected value.

2. The method of claim 1, further comprising displaying information on said imaging device indicating that said strobe should activate during generation of subsequent image data.

3. The method of claim 1, and further comprising displaying information on said imaging device indicating that an image represented by said image data may be blurry.

4. A method of imaging an object, said method comprising:
   generating image data using an imaging device that includes a strobe and a zoom;
   determining if said strobe activated during said generation of image data;
   determining the ambient light intensity during said generation of image data;
   determining the zoom setting during generation of said image data;
   determining that the stability of said imaging device should be increased relative to an object to which image data is generated if said strobe did not activate during said generation of image data, said ambient light intensity was less than a preselected intensity, and said zoom setting was at least one of wider than a first preselected value, between a first value and a second value, and narrower than a second preselected value.

5. The method of claim 4, and further comprising displaying information on said imaging device indicating that an image represented by said image data may be blurry.

6. The method of claim 3, and further comprising displaying information on said imaging device indicating that the stability of said imaging device should be increased during generation of subsequent image data.

7. A method of imaging an object, said method comprising:
   generating image data, using an imaging device that includes a strobe and a ZOOM;
   determining if said strobe activated during said generation of image data;
   determining the zoom setting during generation of said image data;
   determining that said zoom setting should be widened during generation of subsequent image data if said zoom setting was narrower than a preselected amount during generation of said image data, and if said strobe did not activate during said generation of image data, ambient light intensity was less than a preselected intensity, and said zoom setting was at least one of wider than a first preselected value, between a first value and a second value, and narrower than a second preselected value.

8. The method of claim 7, and further comprising displaying information on said imaging device indicating that an image represented
by said image data may be blurry.

9. The method of claim 7, and further comprising displaying information on said imaging device indicating said zoom setting should be widened during generation of subsequent image data.

* * * * *

UNITED STATES PATENT AND TRADEMARK OFFICE
CERTIFICATE OF CORRECTION

Page 1 of 1

PATENT NO. : 8,780,232 B2
APPLICATION NO. : 12/684505
DATED : July 15, 2014
INVENTOR(S) : Murray D. Craig et al.

It is certified that error appears in the above-identified patent and that said Letters Patent is hereby corrected as shown below:

In the Claims

Column 30, line 32, in Claim 7, delete "ZOOM;" and insert -- zoom; --, therefor.

Signed and Sealed this
Tenth Day of February, 2015

Michelle K. Lee
*Deputy Director of the United States Patent and Trademark Office*